US012335913B2

(12) United States Patent
Shi et al.

(10) Patent No.: US 12,335,913 B2
(45) Date of Patent: Jun. 17, 2025

(54) METHOD AND APPARATUS FOR DATA TRANSMISSION

(71) Applicant: Lenovo (Beijing) Ltd., Beijing (CN)

(72) Inventors: Jie Shi, Haidian District (CN); Lianhai Wu, Chaoyang (CN); Haiming Wang, Xicheng District (CN); Jing Han, Chaoyang District (CN); Jie Hu, Changping District (CN)

(73) Assignee: Lenovo (Beijing) Ltd., Beijing (CN)

( * ) Notice: Subject to any disclaimer, the term of this patent is extended or adjusted under 35 U.S.C. 154(b) by 413 days.

(21) Appl. No.: 17/783,479

(22) PCT Filed: Dec. 10, 2019

(86) PCT No.: PCT/CN2019/124359
§ 371 (c)(1),
(2) Date: Jun. 8, 2022

(87) PCT Pub. No.: WO2021/114099
PCT Pub. Date: Jun. 17, 2021

(65) Prior Publication Data
US 2023/0012119 A1 Jan. 12, 2023

(51) Int. Cl.
H04W 68/02 (2009.01)
H04W 74/0833 (2024.01)
(52) U.S. Cl.
CPC ........ H04W 68/02 (2013.01); H04W 74/0833 (2013.01)
(58) Field of Classification Search
None
See application file for complete search history.

(56) References Cited

U.S. PATENT DOCUMENTS 10,932,121 B2 * 2/2021 Kim .................. H04W 74/0833
11,317,373 B2 * 4/2022 Shih .................... H04W 56/005
(Continued)

FOREIGN PATENT DOCUMENTS

CN 106961726 A 7/2017
CN 109792707 A 5/2019
(Continued)

OTHER PUBLICATIONS

Hisilicon Huawei , "Discussion on system level impacts of CIoT MT-EDT", 3GPP TSG-SA2 Meeting #134, S2-1907730, Sapporo, Japan [retrieved Aug. 17, 2022]. Retrieved from the internet <https://www.3gpp.org/ftp/tsg_sa/WG2_Arch/TSGS2_134_Sapporo/Docs/?sortby=sizerev>., Jun. 2019, 7 Pages.
PCT/CN2019/124359 , "International Preliminary Report on Patentability", PCT Application No. PCT/CN2019/124359, Jun. 23, 2022, 6 pages.
PCT/CN2019/124359 , "International Search Report and Written Opinion", PCT Application No. PCT/CN2019/124359, Sep. 15, 2020, 7 pages.
(Continued)

Primary Examiner — Adolf Dsouza
(74) Attorney, Agent, or Firm — FIG. 1 Patents

(57) ABSTRACT

The present application relates to a user equipment, a base station, a core network and a method for data transmission. The user equipment transmits capability information to the core network for indicating to the core network at least one downlink data transmission procedure supported by the user equipment. The core network transmits a first paging message to the base station. The base station transmits a second paging message to the user equipment. The user equipment selects a downlink data transmission procedure from the at least one downlink data transmission procedure after receiving the second paging message.

20 Claims, 19 Drawing Sheets

(56) References Cited

U.S. PATENT DOCUMENTS

| | | | |
|---|---|---|---|
| 11,395,224 B2* | 7/2022 | Ahn | H04W 52/0209 |
| 2019/0104553 A1 | 4/2019 | Johansson et al. | |
| 2019/0223221 A1* | 7/2019 | Johansson | H04W 76/27 |

FOREIGN PATENT DOCUMENTS

| | | | |
|---|---|---|---|
| CN | 110063085 A | 7/2019 | |
| CN | 110447296 A | 11/2019 | |
| WO | 2012058797 A1 | 5/2012 | |
| WO | 2018199673 A1 | 11/2018 | |
| WO | 2019031427 A1 | 2/2019 | |
| WO | 2019062926 A1 | 4/2019 | |
| WO | 2019194409 A1 | 10/2019 | |

OTHER PUBLICATIONS

Qualcomm Incorporated, "Core Network impacts from MT-EDT", SA WG2 Meeting #134, S2-1907604, Sapporo, Japan [retrieved Aug. 16, 2022]. Retrieved from the internet <https://www.3gpp.org/ftp/tsg_sa/WG2_Arch/TSGS2_134_Sapporo/Docs/?sortby-sizerev>., Jun. 2019, 9 Pages.

201980102830, "Foreign Office Action", CN Application No. 201980102830, Jun. 18, 2024, 30 pages.

Intel, "Discussion to support MT-EDT", SA WG2 Meeting #134, S2-1907579, Sapporo, Japan, Jun. 2019, 4 pages.

* cited by examiner

METHOD AND APPARATUS FOR DATA TRANSMISSION

TECHNICAL FIELD

The present disclosure generally relates to data transmission, and relates more particularly to Early Data Transmission.

BACKGROUND OF THE INVENTION

For improving efficiency of data transmission, techniques of Early Data Transmission (EDT) are introduced for some networks, e.g., Narrow Band-Internet of Things (NB-IoT), enhanced Machine Type Communication (eMTC), etc. EDT includes Mobile Originating EDT (MO-EDT) and Mobile Terminated EDT (MT-EDT).

For MT-EDT, after receiving paging, user equipment needs to initiate a downlink data receiving procedure to receive downlink data. There are many types of downlink data receiving procedure to be applied by the user equipment based on the requirement of data transmission. However, specific details for base station, user equipment and core network to apply the same downlink data receiving procedure have not been discussed yet and there are still some issues that need to be solved.

BRIEF SUMMARY OF THE INVENTION

One embodiment of the present disclosure provides a method of a user equipment. The method includes: receiving a paging message from a base station; and selecting a downlink data transmission procedure from at least one downlink data transmission procedure after receiving the paging message.

Another embodiment of the present disclosure provides a method of a core network. The method includes: transmitting a paging message to a base station, wherein the paging message comprises user equipment information corresponding to a user equipment, and at least one of data size information and user equipment service type information.

Another embodiment of the present disclosure provides a method of a base station. The method includes: receiving a first paging message from a core network or another base station, wherein the first paging message includes user equipment information corresponding to a user equipment; and determining a downlink data transmission procedure for the user equipment after receiving the first paging message.

Another embodiment of the present disclosure provides a method of a base station. The method includes: transmitting a paging message to another base station for the another base station to determine a downlink data transmission procedure for a user equipment, wherein the paging message includes user equipment information corresponding to the user equipment.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION OF THE INVENTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
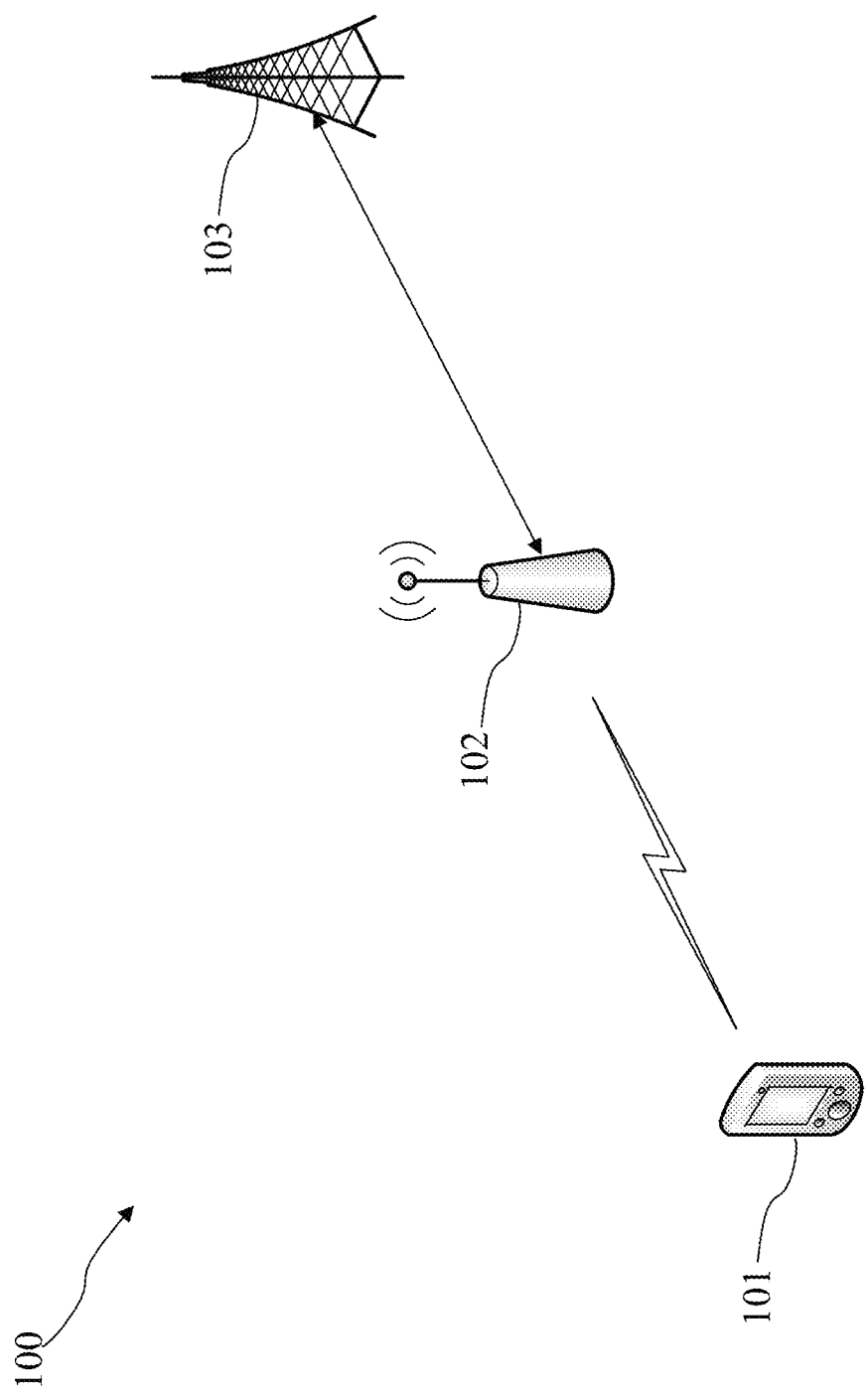
FIG. 1 illustrates a wireless communication system according to an embodiment of the present disclosure.

Referring to FIG. 1, a wireless communication system 100 may include a user equipment (UE) 101, a base station (BS) 102 and a core network (CN) 103. Although a specific number of UE 101, BS 102 and CN 103 are depicted in FIG. 1, it is contemplated that any number of UEs 101, BSs 102 and CNs 103 may be included in the wireless communication system 100.

CN 103 may include a core Access and Mobility management Function (AMF) entity. BS 102, which may communicate with CN 103, may operate or work under the control of the AMF entity. CN 103 may further include a User Plane Function (UPF) entity, which communicatively coupled with the AMF entity.

BS 102 may be distributed over a geographic region. In certain embodiments of the present application, BS 102 may also be referred to as an access point, an access terminal, a base, a base unit, a macro cell, a Node-B, an evolved Node B (eNB), a gNB, a Home Node-B, a relay node, or a device, or described using other terminology used in the art. BS 102 is generally part of a radio access network that may include one or more controllers communicably coupled to one or more corresponding BS (s).

UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, UE 101 may include, for example, but is not limited to, wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. UE 101 may communicate directly with BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G New Radio (NR) of the 3GPP protocol or the 5G NR-light of the 3GPP protocol, wherein BSs 102 transmit data using an OFDM modulation scheme on the downlink (DL) and UE 101 transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, BS 102 may communicate using other communication protocols, such as the IEEE 802.11 family of wireless communication protocols. Further, in some embodiments of the present application, BS 102 may communicate over licensed spectrums, whereas in other embodiments BS 102 may communicate over unlicensed spectrums. The present application is not intended to be limited to the implementation of any particular wireless communication system architecture or protocol. In yet some embodiments of present application, BS 102 may communicate with UE 101 using the 3GPP 5G protocols.

According to some existing agreements for Mobile Terminated Early Data Transmission (MT-EDT), after receiving paging with UE identification record, UE 101 may need to initiate a DL data receiving procedure to receive DL data. Some types of DL data receiving procedure may be candidates to be applied by UE 101 based on the requirement from small data transmission or 10 Mbps data rate in NR-Light.

In some embodiments, the DL data receiving procedures may include: (1) Message 2 (Msg.2) based Random Access (RA) procedure; (2) Message 4 (Msg.4) based RA procedure; (3) 2-step RA procedure; (4) regular RA procedure; (5) a preconfigured uplink resource procedure; and (6) a procedure where DL information is transmitted in paging message.

In particular, in Msg.2 based RA procedure, BS 102 may transmit some DL data to UE 101 by an RA response (i.e., Message 2 of MT-EDT) in response to an RA preamble (i.e., Message 1 of MT-EDT). In Msg.4 based RA procedure, BS 102 may transmit some DL data to UE 101 at Msg.4 of RA in response to a message (i.e., Message 3 of RA procedure). In 2-step RA procedure, BS 102 may transmit some DL data to UE 101 by a response (i.e., Message B of 2-step RA procedure) in response to a Msg.A.

In regular RA procedure, BS 102 may transmit some DL data to UE 101 after UE 101 enters in connected mode (i.e., the first DL message after UE 101 enters in connected mode). In preconfigured uplink resource procedure which may be without transmission of preamble, BS 102 may transmit some DL data to UE 101 after uplink information is transmitted at Preconfigured Uplink Resource (PUR) from UE 101 to BS 102. However, specific details for UE 101, BS 102 and CN 103 to apply the same DL data receiving procedure have not been discussed yet and there are still some issues that need to be solved.

Figure 2A:
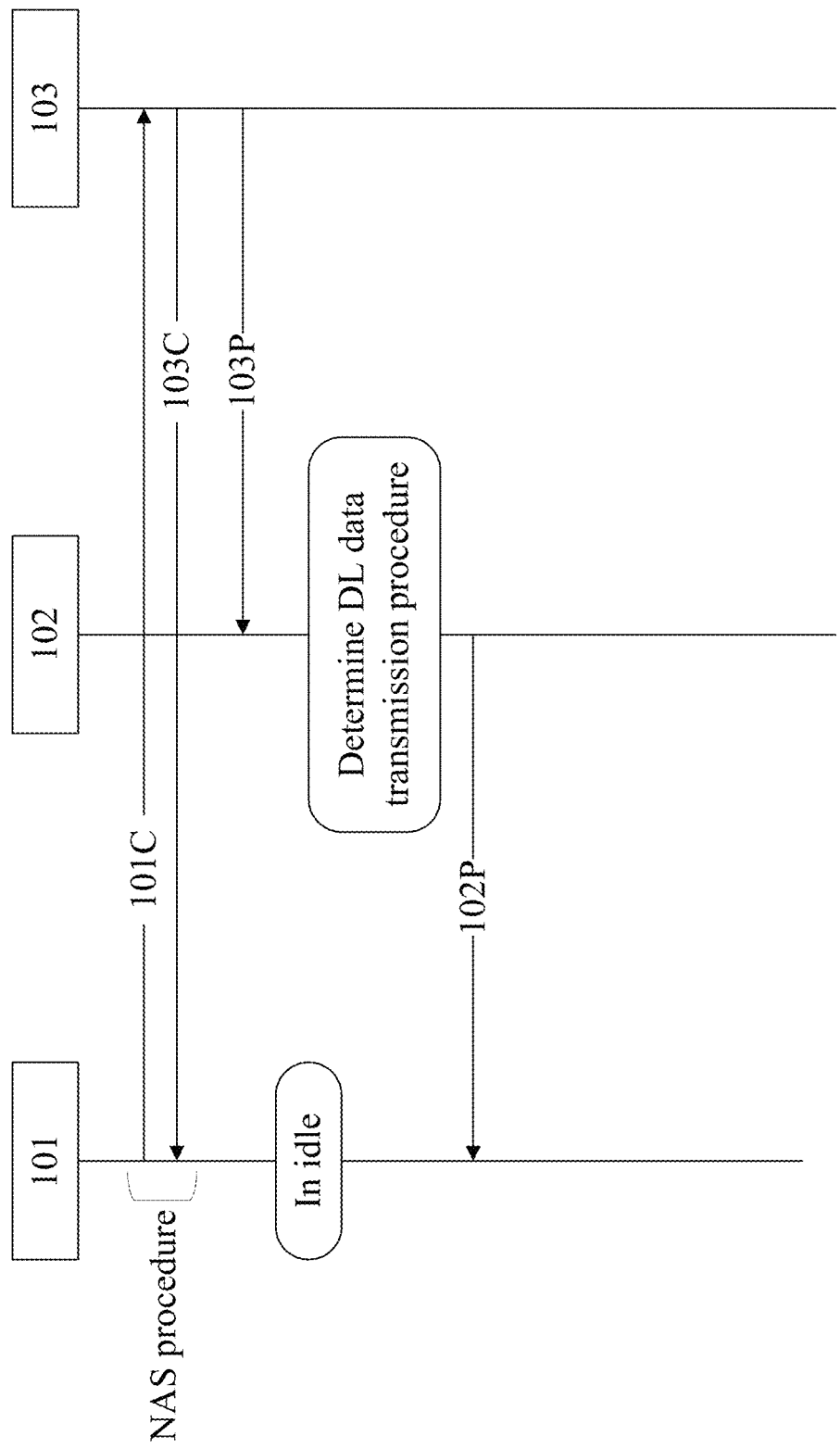
FIGS. 2A to 2D are schematic views of message transmission among a wireless communication system according to an embodiment of the present disclosure.

Referring to FIG. 2A, during a Non-access stratum (NAS) procedure between UE 101, BS 102 and CN 103, UE 103 may report capability information 101C to CN 103. In particular, different UEs or UE services may support different DL data transmission procedures. Accordingly, UE 101 may need to report its capability information 101C for indicating to CN 103 at least one DL data transmission procedure supported by UE 101.

In detail, during the NAS procedure, UE 101 may transmit the capability information 101C to the AMF entity of CN 103 via BS 102. In some embodiments, the capability information 101C may be used to indicate to the AMF entity at least one DL data transmission procedure supported by UE 101. More particularly, in some embodiments, the capability information 101C may be used to indicate to the AMF entity at least one DL data transmission procedure supported by UE 101 while UE 101 is under an idle status or in an inactive status.

In some embodiments, the capability information 101C may include at least one preference procedure of the at least one DL data transmission procedure when UE 101 is in the idle status or the inactive status. Accordingly, after receiving the capability information 101C with the at least one preference procedure from UE 101, the AMF entity of CN 103 may be indicated the at least one preference procedure of UE 101 when UE 101 is in the idle status or the inactive status.

For example, when UE 101 supports three types of DL data transmission procedures which are type "A", type "B" and type "C" and the preference procedure of UE 101 is type "A", UE 101 transmits the capability information 101C to the AMF entity of CN 103 for indicating to the AMF entity that UE 101 supports type "A", type "B" and type "C".DL data transmission procedures and the preference procedure of UE 101 is type "A". Subsequently, after receiving the capability information 101C from UE 101, the AMF entity is indicated that UE 101 supports type "A", type "B" and type "C" DL data transmission procedures and the preference procedure of UE 101 is type "A". In some implementations, the preference procedure of UE 101 may include one or more DL data transmission procedure. For instance, the preference procedure of UE 101 may be 2-step RA procedure and PUR procedure. Or, UE 101 may implicitly transmit the preference procedure by transmitting an indication that indicates a service type which UE 101 requires. In other words, the service type may be associated to the preference procedure.

In some embodiments, the capability information 101C may include ranking information for a priority of the at least one DL data transmission procedure. Accordingly, after receiving the capability information 101C with the ranking information from UE 101, the AMF entity of CN 103 may be indicated the priority of the at least one DL data transmission procedure of UE 101.

For example, when UE 101 supports three types of DL data transmission procedures which are type "X", type "Y" and type "Z" and the ranking information includes a priority order of type "Y", type "X" and type "Z" from high to low, UE 101 transmits the capability information 101C to the AMF entity of CN 103 for indicating to the AMF entity that UE 101 supports type "X", type "Y" and type "Z" DL data transmission procedures and the priority order is type "Y", type "X" and type "Z" from high to low. Subsequently, after receiving the capability information 101C from UE 101, the AMF entity is indicated that UE 101 supports type "X", type "Y" and type "Z" DL data transmission procedures and the priority order is type "Y", type "X" and type "Z" from high to low.

During the NAS procedure, the AMF entity of CN 103 may determine UE configuration information 103C for UE 101. In some embodiments, the UE configuration information 103C may include a determined DL data transmission procedure supported by UE 101 while UE 101 is under an idle status or in an inactive status. In some embodiments, the UE configuration information 103C may include the ranking information for the priority of the at least one DL data transmission procedure supported by UE 101 while UE 101 is under an idle status or in an inactive status. In some embodiments, the AMF entity of CN 103 may transmit the UE configuration information 103C to UE 101 via BS 102 during the NAS procedure. In some embodiments, the NAS procedure may include at least one of a Tracking Area Update (TAU) procedure and an attach procedure of LTE or New Radio (NR).

In some embodiments, UE 103 may enter the idle status after the NAS procedure. Then, when CN 103 needs to transmit DL data to UE 101, the AMF entity of CN 103 may transmit a paging message 103P to BS 102 which serves UE 101. The paging message 103P may include UE information (e.g., an UE identification of UE 101) and the UE configuration information 103C of UE 101. BS 102 may determine a DL data transmission procedure for UE 101 according to the UE configuration information 103C.

Next, BS 102 may transmit a paging message 102P to UE 101. The paging message 102P may include a procedure indication. After receiving the paging message 102P, UE 101 may select the DL data transmission procedure according to the procedure indication so that UE 101 may receive DL data from BS 102 according to the DL data transmission procedure.

In some embodiments, the paging messages may include available resources of an idle status or an inactive status of UE 101. In detail, the available resource may be used to explicitly or implicitly indicate the procedure that UE 101 selects as the DL data transmission procedure. The available resource may be the resource for at least one of: (1) resource of Msg.1 for Msg.2 based RA procedure; (2) resource of Msg.1 for Msg.4 based RA procedure; (3) resource of Msg.A for 2-step RACH procedure; (4) resource of Msg.1 for regular RA procedure; (5) resource of preconfigured uplink resource procedure; or (6) resource of DL data in paging message or the scheduling information of DL data in paging message.

In some embodiments, the procedure indication may indicate to UE 101 to select the DL data transmission procedure from one of the following DL data transmission procedures: (1) Msg.2 based RA procedure; (2) Msg.4 based RA procedure; (3) 2-step RACH procedure; (4) regular RA procedure; (5) preconfigured uplink resource procedure; and (6) procedure where DL information is transmitted in paging message.

Furthermore, in some embodiments, there may be a default setting of a procedure set configured in UE 101 and BS 102. The procedure set may be set including at least one of: (1) the Msg.2 based RA procedure; (2) the Msg.4 based RA procedure; (3) the 2-step RACH procedure; (4) the preconfigured uplink resource procedure; (5) the 4-step RACH procedure; (6) the regular RA procedure; and (7) procedure where DL information is transmitted in paging message. Furthermore, the procedure set may be:

set A including the Msg.2 based RA procedure, the Msg.4 based RA procedure, the 2-step RACH procedure, the preconfigured uplink resource procedure and the regular RA procedure;

set B including the Msg.4 based RA procedure, the 2-step RACH procedure, the preconfigured uplink resource procedure and the regular RA procedure;

set C including the 2-step RACH procedure, a 4-step RACH procedure and the preconfigured uplink resource procedure;

set D including the 2-step RACH procedure, the 4-step RACH procedure, the preconfigured uplink resource procedure and the regular RA procedure;

set E including the 2-step RACH procedure and the preconfigured uplink resource procedure;

set F including the 2-step RACH procedure, the preconfigured uplink resource procedure and the regular RA procedure;

set G including the 4-step RACH procedure, the preconfigured uplink resource procedure and the regular RA procedure;

set H including the 4-step RACH procedure and the preconfigured uplink resource procedure;

set I including the 2-step RACH procedure and the 4-step RACH procedure; or set J including the 2-step RACH procedure, the 4-step RACH procedure, and the regular RA procedure.

It should be noted that, in some embodiments, the 4-step RACH procedure may include a RACH procedure which is applied by UE 101 to receive DL data at the step of Msg.2 in Msg.2 based RA procedure, or at the step of the Msg.4 in Msg.4 based RA procedure. In some embodiments, the 4-step RACH procedure may include a RACH procedure which is applied by UE 101 to transmit UL data at the step of Msg.3 of some RA procedures.

In these embodiments, the procedure indication indicates to UE 101 to select the DL data transmission procedure from one element of the procedure set. For example, when the default setting of the procedure set A is configured in UE 101 and BS 102, the procedure indication indicates to UE 101 to select the DL data transmission procedure from one of: the Msg.2 based RA procedure, the Msg.4 based RA procedure, the 2-step RACH procedure, the preconfigured uplink resource procedure and the regular RA procedure.

Figure 2B:
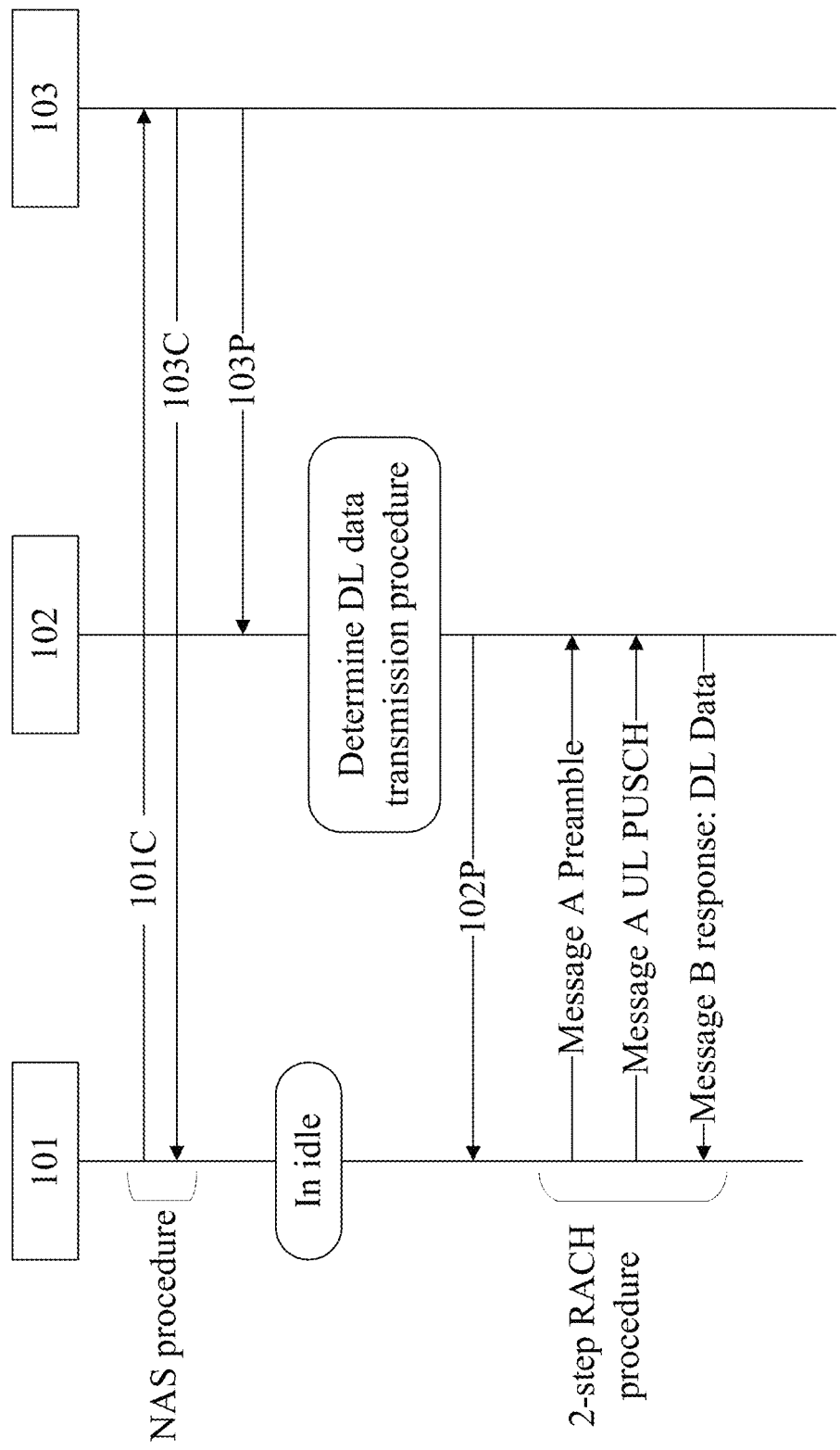

Referring to FIG. 2B, in some embodiments, 2-step RACH procedure may be applied as the DL data transmission procedure between UE 101 and BS 102. In particular, the procedure indication from BS 102 indicates to UE 101 to select 2-step RACH procedure as the DL data transmission procedure. Then, after receiving the paging message 102P with the procedure indication, UE 101 may apply 2-step RACH procedure as the DL data transmission procedure.

Next, UE 101 may transmit Message A preamble (i.e., Message A preamble of 2-step RACH procedure) to BS 102 and transmit Message A UL Physical Uplink Shared Channel (PUSCH) (i.e., Message A UL PUSCH of 2-step RACH procedure) to BS 102. Then, UE 101 may receive Message B response (i.e., Message B response of 2-step RACH procedure) with DL data from BS 102.

Figure 2C:
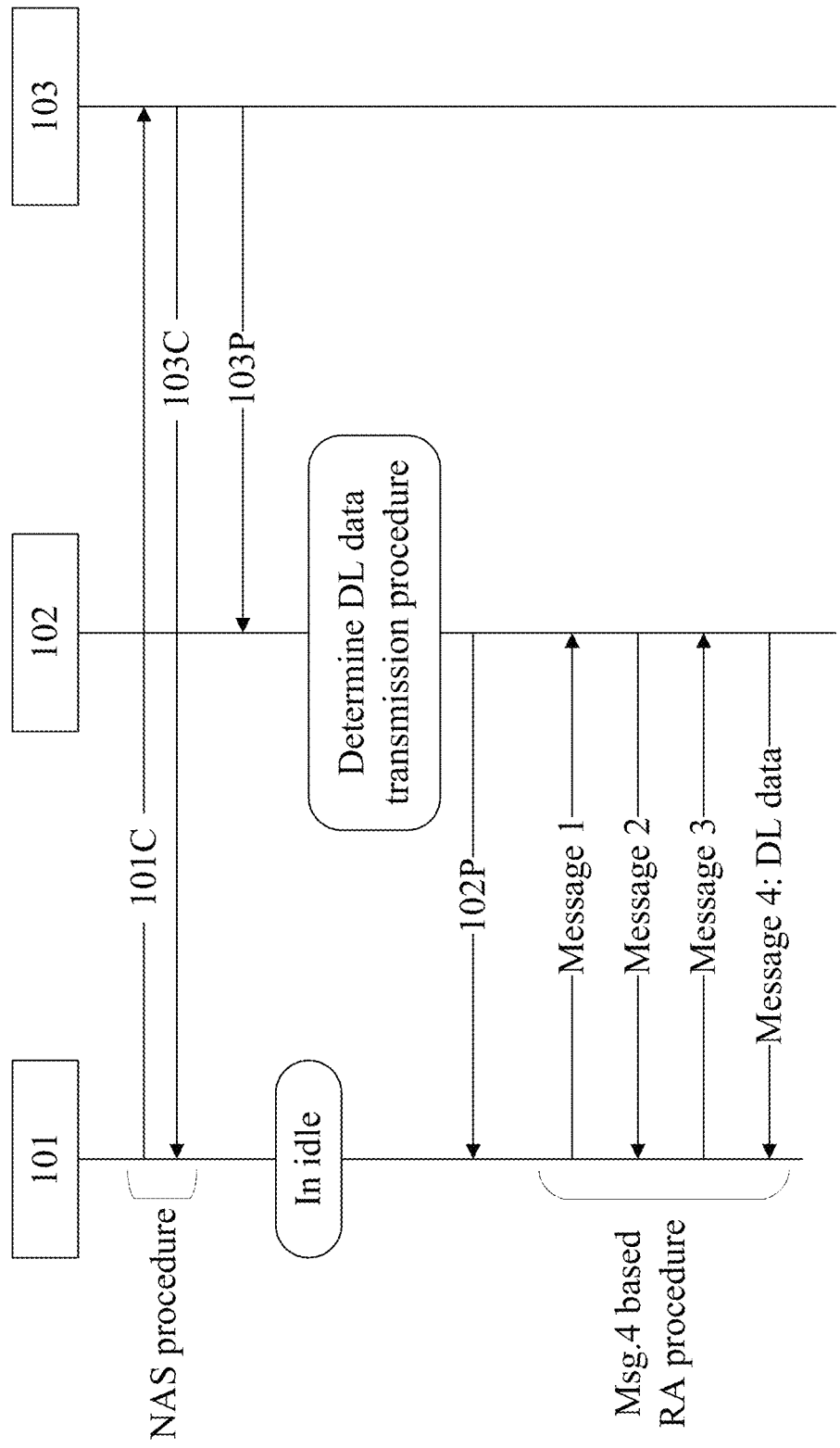

Referring to FIG. 2C, in some embodiments, Msg.4 based RA procedure may be applied as the DL data transmission procedure between UE 101 and BS 102. In particular, the procedure indication from BS 102 indicates to UE 101 to select Msg.4 based RA RACH procedure as the DL data transmission procedure. Then, after receiving the paging message 102P with the procedure indication, UE 101 may apply Msg.4 based RA procedure as the DL data transmission procedure.

Next, UE 101 may transmit Message 1 preamble (i.e., Message 1 preamble of Msg.4 based RA procedure) to BS 102. UE 101 may receive Message 2 RA response (i.e., Message 2 RA response of Msg.4 based RA procedure) from BS 102. UE 101 may transmit Message 3 (i.e., Message 3 of Msg.4 based RA procedure) to BS 102. Then, UE 101 may receive Message 4 (i.e., Message 4 of Msg.4 based RA procedure) which includes DL data from BS 102.

Figure 2D:
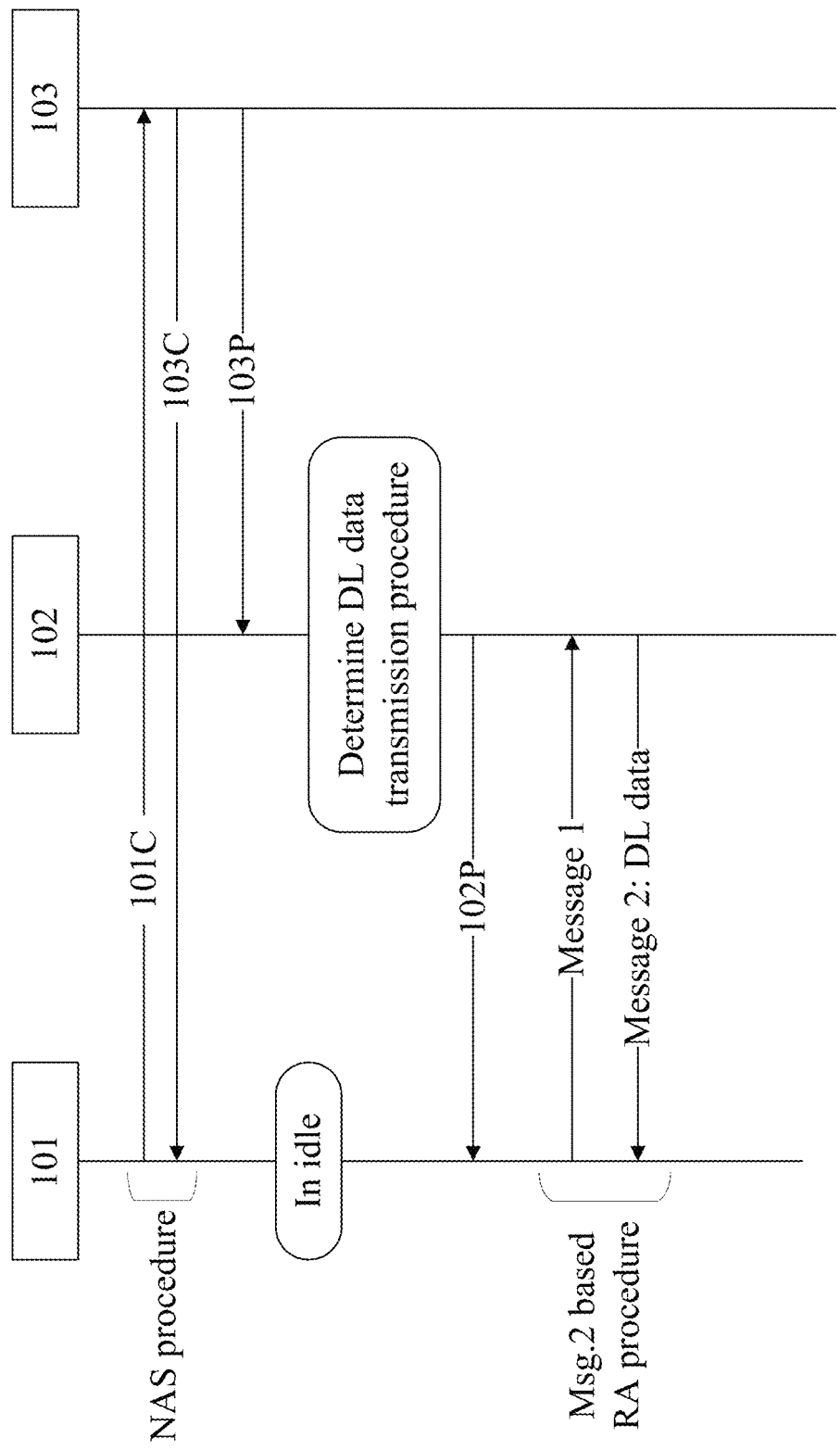

Referring to FIG. 2D, in some embodiments, Msg.2 based RA procedure may be applied as the DL data transmission procedure between UE 101 and BS 102. In particular, the procedure indication from BS 102 indicates to UE 101 to select Msg.2 based RA RACH procedure as the DL data transmission procedure. Then, after receiving the paging message 102P with the procedure indication, UE 101 may apply Msg.2 based RA procedure as the DL data transmission procedure.

Next, UE 101 may transmit Message 1 preamble (i.e., Message 1 preamble of Msg.2 based RA procedure) to BS 102. Then, UE 101 may receive Message 2 (i.e., Message 2 of Msg.2 based RA procedure) which includes DL data from BS 102.

In some embodiments, the preconfigured uplink resource procedure may include a step of transmission of preamble or may be without the step of transmission of preamble. In detail, for the preconfigured uplink resource procedure without the step of transmission of preamble, UE 101 may be given a preconfigured uplink resource. Then UE 101 may transmit UL data in the given preconfigured uplink resource and receive DL data after transmitting on the given preconfigured uplink resource. On the other hand, for the preconfigured uplink resource procedure with the step of transmission of preamble, UE 101 may be given a preconfigured uplink resource and preamble information. Then UE 101 may determine a preamble according to the preamble information, transmit the preamble and UL data in the given preconfigured uplink resource, and receive DL data after transmitting the given preconfigured uplink resource.

In some embodiments, for regular RA procedure, UE 101 may receive DL data or transmit UL data after UE 101 enters a connected mode. In some embodiments, for the procedure where DL information is transmitted in a paging message, the paging message may include UE identification information, and at least one of DL data information of UE 101 or scheduling information on DL data of UE101.

Figure 3:
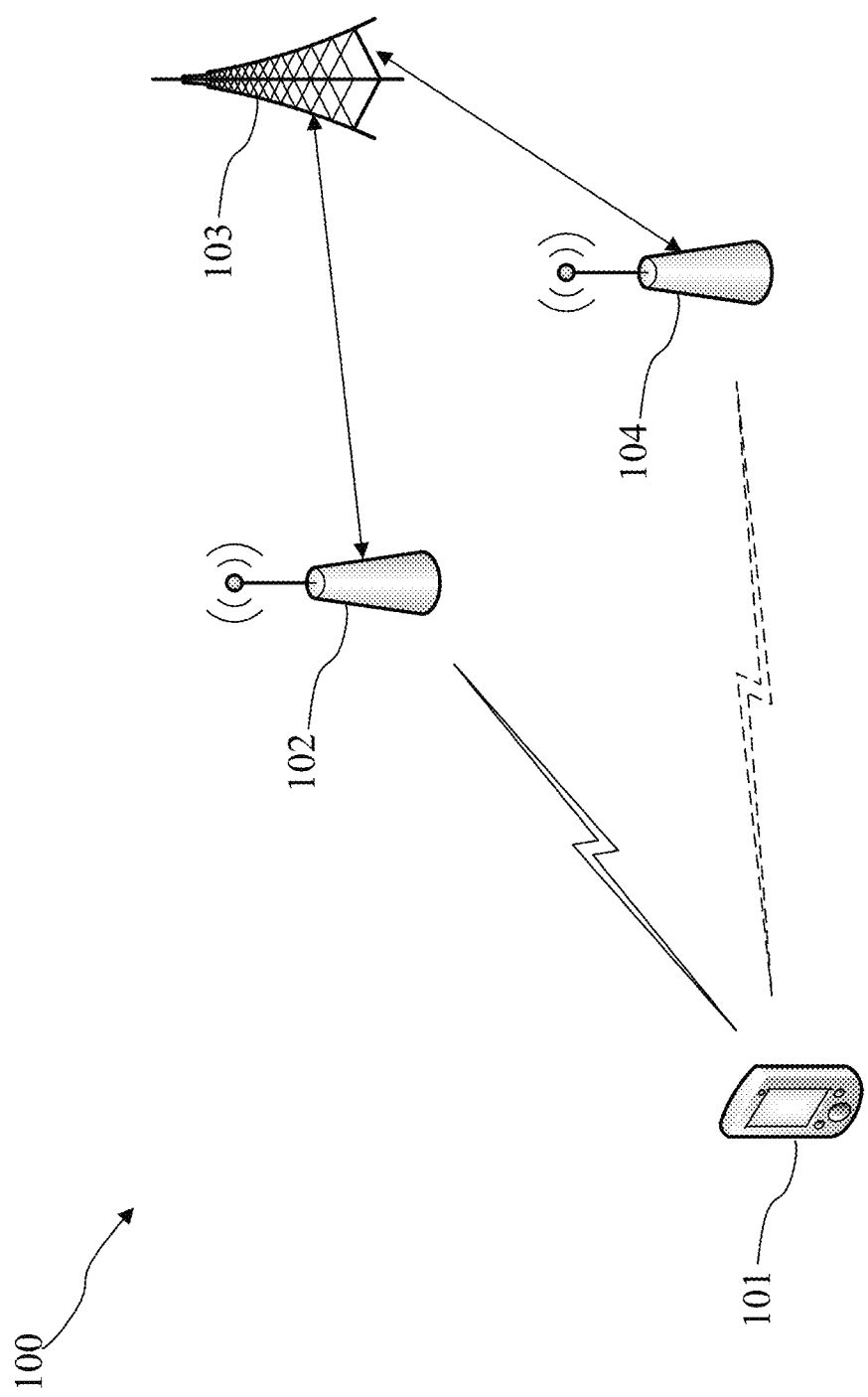
FIG. 3 illustrates a wireless communication system according to an embodiment of the present disclosure.

Referring to FIG. 3, the wireless communication system 100 may further include a BS 104. In some embodiments, BS 102 may be the base station which is serving UE 101 and BS 104 may be the last serving base station.

Figure 4A:
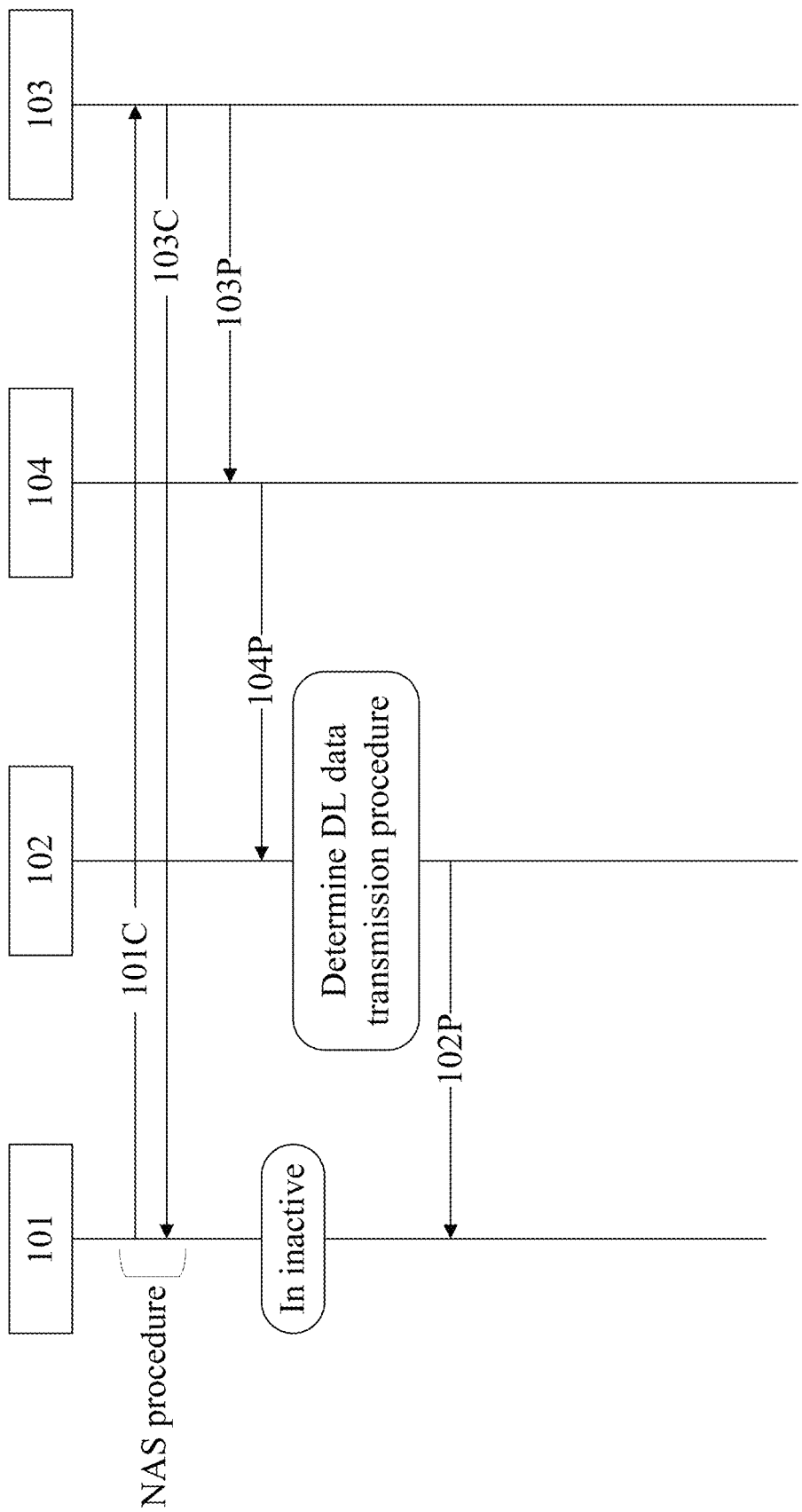
FIGS. 4A to 4D are schematic views of message transmission among a wireless communication system according to an embodiment of the present disclosure.

Referring to FIG. 4A, during the NAS procedure between UE 101, BS 102, BS 104 and CN 103, UE 103 may report capability information 101C to CN 103. The AMF entity of CN 103 may determine UE configuration information 103C for UE 101.

In some embodiments, UE 103 may enter the inactive status after the NAS procedure. Then, when CN 103 needs to transmit DL data to UE 101, the AMF entity of CN 103 may transmit the paging message 103P to BS 104 which is the last serving base station of UE 101. The paging message 103P may include the UE identification of UE 101 and the UE configuration information 103C of UE 101.

Next, BS 104 may transmit a paging message 104P to BS 102. In some embodiments, the paging message 104P may include the UE identification of UE 101 and the UE configuration information 103C of UE 101. Accordingly, BS 102 may determine the DL data transmission procedure for UE 101 according to the UE configuration information 103C. In some embodiments, BS 104 may determine the DL data transmission procedure for UE 101 according to the UE configuration information 103C and the paging message 104P include an indication which indicate to BS 102 the DL data transmission procedure for UE 101.

In some embodiments, the UE configuration information may include at least one of UE context information and UE capability information on UE supporting DL data transmission procedure. Similar to the above embodiments, the capability information of theses embodiments may include ranking information for a priority of the at least one DL data transmission procedure. Accordingly, after receiving the capability information with the ranking information from UE 101, the AMF entity of CN 103 may be indicated the priority of the at least one DL data transmission procedure of UE 101.

Next, BS 102 may transmit the paging message 102P to UE 101. The paging message 102P may include the procedure indication. After receiving the paging message 102P, UE 101 may select the DL data transmission procedure according to the procedure indication so that UE 101 may receive DL data from BS 102 according to the DL data transmission procedure.

Figure 4B:
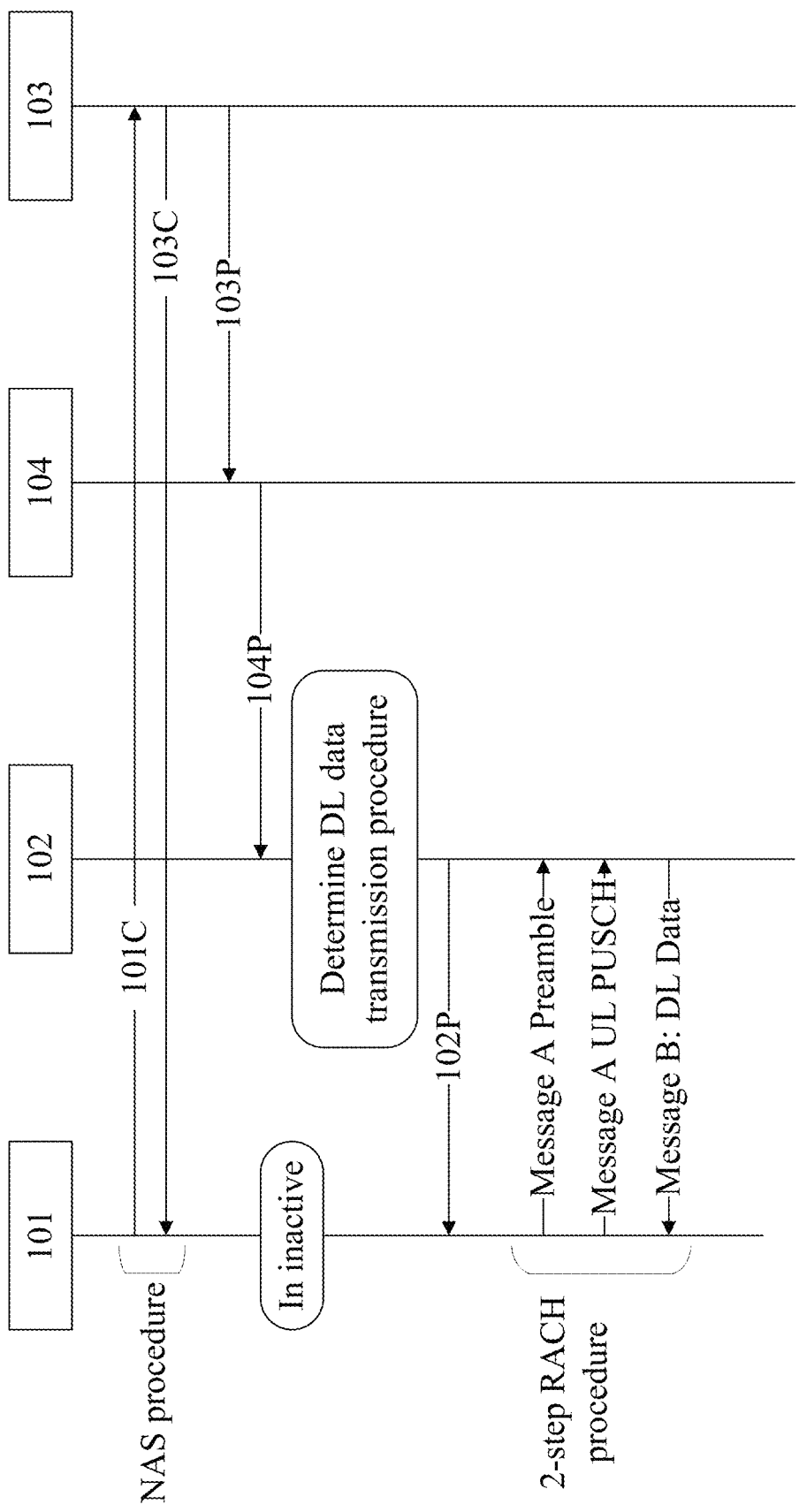

Referring to FIG. 4B, in some embodiments, 2-step RACH procedure may be applied as the DL data transmission procedure between UE 101 and BS 102. In particular, the procedure indication from BS 102 indicates to UE 101 to select 2-step RACH procedure as the DL data transmission procedure. Then, after receiving the paging message 102P with the procedure indication, UE 101 may apply 2-step RACH procedure as the DL data transmission procedure.

Next, UE 101 may transmit Message A preamble (i.e., Message A preamble of 2-step RACH procedure) to BS 102 and transmit Message A UL PUSCH (i.e., Message A UL PUSCH of 2-step RACH procedure) to BS 102. Then, UE 101 may receive Message B response (i.e., Message B preamble of 2-step RACH procedure) with DL data from BS 102.

Figure 4C:
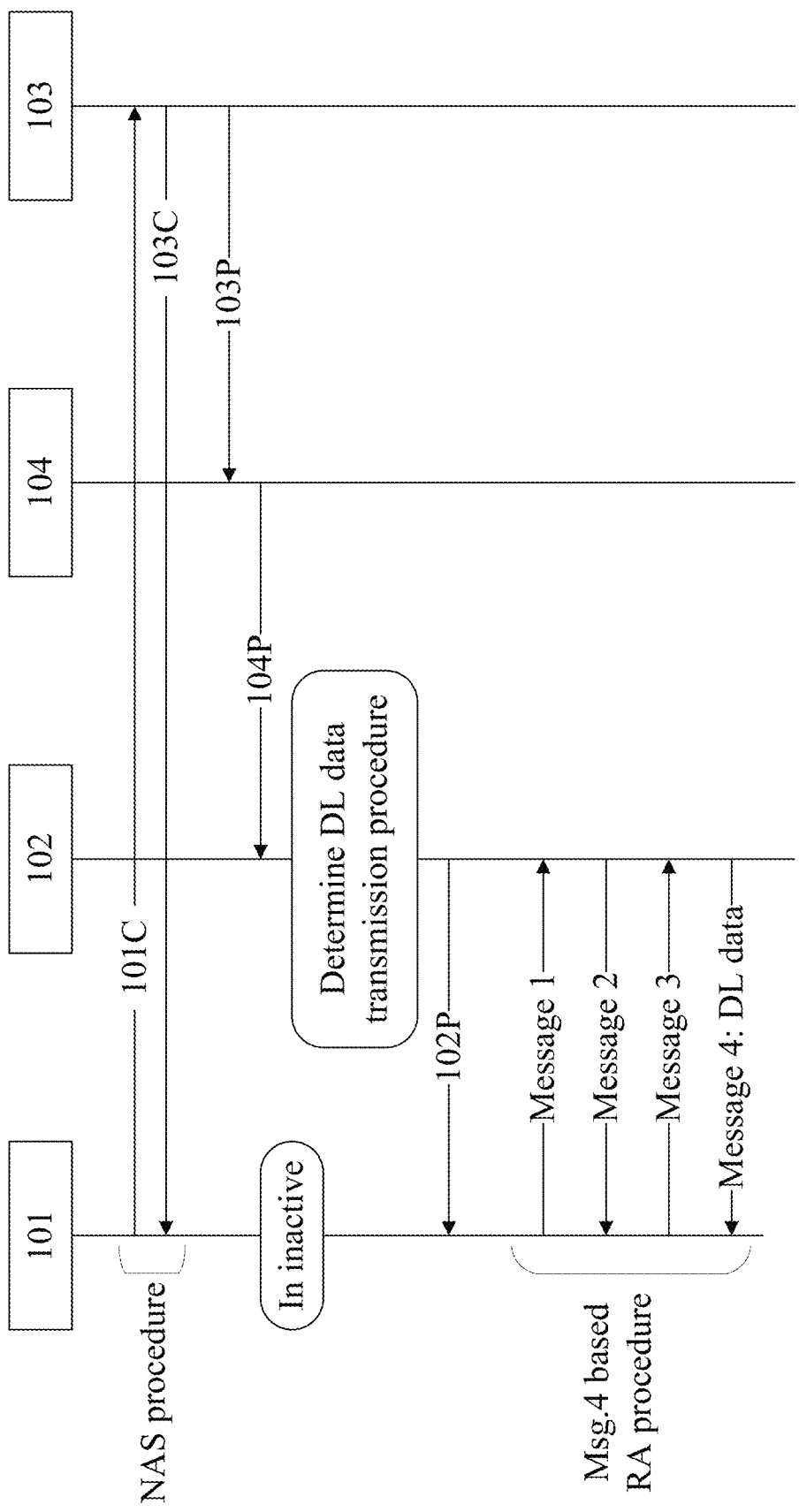

Referring to FIG. 4C, in some embodiments, Msg.4 based RA procedure may be applied as the DL data transmission procedure between UE 101 and BS 102. In particular, the procedure indication from BS 102 indicates to UE 101 to select Msg.4 based RA RACH procedure as the DL data transmission procedure. Then, after receiving the paging message 102P with the procedure indication, UE 101 may apply Msg.4 based RA procedure as the DL data transmission procedure.

Next, UE 101 may transmit Message 1 preamble (i.e., Message 1 preamble of Msg.4 based RA procedure) to BS 102. UE 101 may receive Message 2 RA response (i.e., Message 2 RA response of Msg.4 based RA procedure) from BS 102. UE 101 may transmit Message 3 (i.e., Message 3 of Msg.4 based RA procedure) to BS 102. Then, UE 101 may receive Message 4 (i.e., Message 4 of Msg.4 based RA procedure) which includes DL data from BS 102.

Figure 4D:
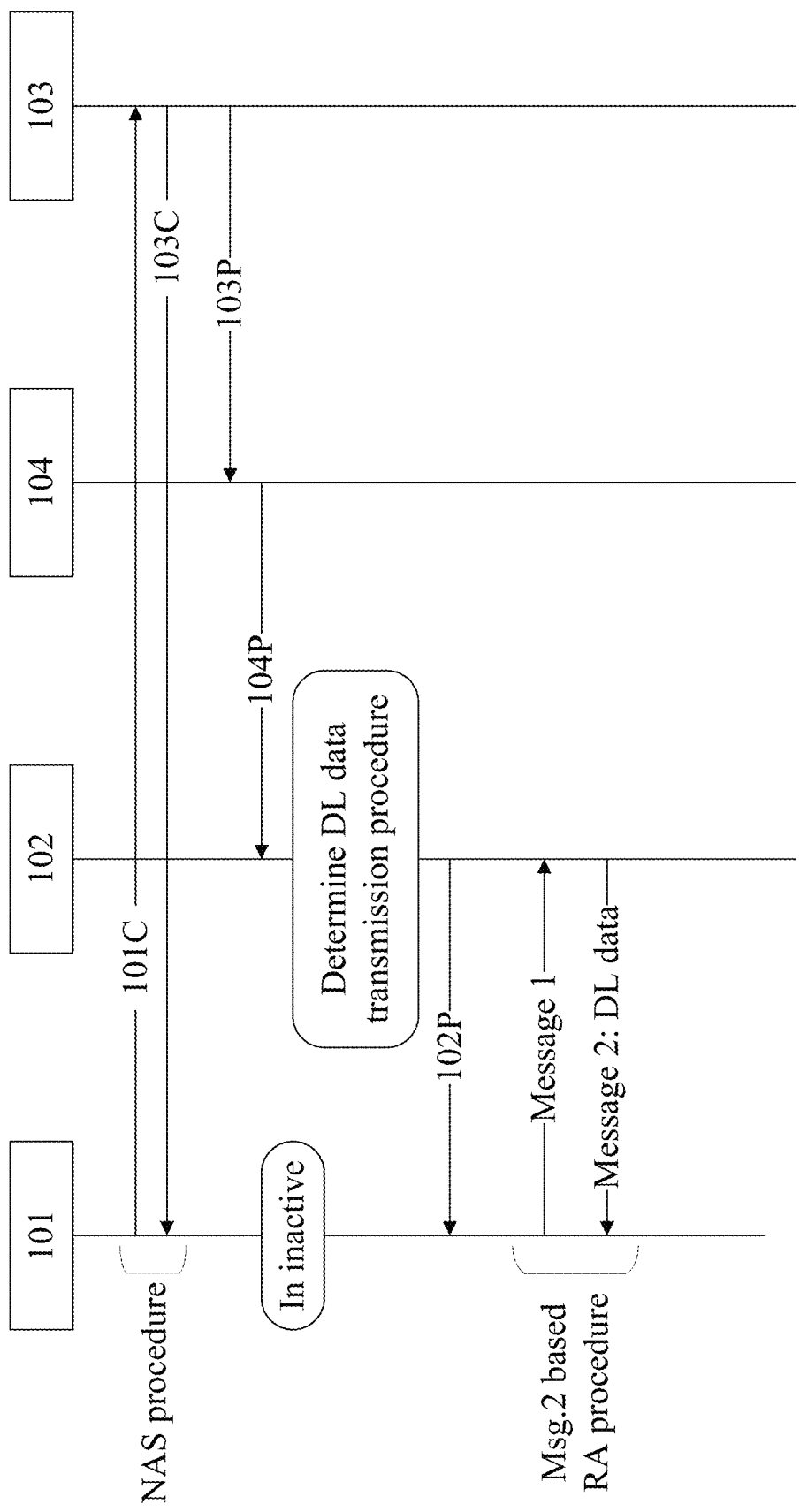

Referring to FIG. 4D, in some embodiments, Msg.2 based RA procedure may be applied as the DL data transmission procedure between UE 101 and BS 102. In particular, the procedure indication from BS 102 indicates to UE 101 to select Msg.2 based RA RACH procedure as the DL data transmission procedure. Then, after receiving the paging message 102P with the procedure indication, UE 101 may apply Msg.2 based RA procedure as the DL data transmission procedure.

Next, UE 101 may transmit Message 1 preamble (i.e., Message 1 preamble of Msg.2 based RA procedure) to BS 102. Then, UE 101 may receive Message 2 (i.e., Message 2 of Msg.2 based RA procedure) which includes DL data from BS 102.

In some embodiments, the procedure indication may indicate step information the DL data should be transmitted. In particular, the procedure indication may indicate to UE 101 to receive DL data in: (1) step of Message B corresponding to 2-step RACH procedure; (2) step of Message 2 after preamble corresponding to Msg.2 based RA procedure; (3) step of Message 2 after preconfigured uplink resource; (4) step of Message 4 after Message 3 corresponding to Msg.4 based RA procedure; or (5) step after entering connected mode in network by RA procedure.

In some embodiments, the procedure indication may indicate step information the UL data should be required. In particular, the procedure indication may indicate to UE 101 to transmit UL data in: (1) step of Message A corresponding to 2-step RACH procedure; (2) step of Message 3 after Message 2 corresponding to Msg.2 based RA procedure; (3) step of applying preconfigured uplink resource; (4) step of Message 3 before Message 4 corresponding to Msg.4 based RA procedure; (5) step before download data initially transmitted from BS 102; (6) step after download data initially transmitted from BS 102; or (7) step after entering connected mode in network by RA procedure.

In some embodiments, the paging message 103P may further include at least one of data size information and UE service type information. In detail, the AMF entity of CN 103 may transmit the data size information and/or service type information of UE 101 with the paging message 103P to BS 104. After receiving the data size information and/or the service type information of UE 101, BS 104 may transmit the data size information and the service type information of UE 101 to BS 102. In some embodiments, the data size information may indicate to BS 102 whether small data transmission or Msg.4/Msg.2 based RA procedure can be initiated.

In some embodiments, the service type information may indicate UE service type. For example, the UE service type includes emergency service, time tolerance service, service with Quality of Service (QoS) information, service with QoS Class Identification (QCI) information, small data transmission service or service which needs UE 101 be in connected mode.

Further, the UE service type may indicate that UE 101 may transmit the feedback corresponding to DL transmission. In other words, according to the UE service type, UE 101 may be required to transmit the feedback corresponding to the DL transmission. On the other hand, the UE service type may indicate that UE 101 may not transmit the feedback corresponding to DL transmission. In other words, according to the UE service type, UE 101 may not be required to transmit the feedback corresponding to DL transmission.

In some embodiments, the DL data transmission procedure may be initialed as the selected DL data transmission procedure between UE 101 and BS 102 when BS 102 supports the selected DL data transmission procedure. In some embodiments, the DL data transmission procedure may be initiated as a regular RA procedure between UE 101 and BS 102 when BS 102 does not support the selected DL data transmission procedure.

In some embodiments, BS 102 may broadcast a System Information Block (SIB) to UE 101 and the SIB may include a supporting, enabled or disabled DL data transmission procedure of BS 102. Subsequently, UE 101 may receive the SIB from BS 102 and be indicated the supporting or the enabled DL data transmission procedure of BS 102. In some embodiments, the paging message 102P may include some DL data or scheduling information for DL data.

In some embodiments, BS 102 may transmit information of the DL data transmission procedure to a neighbor base station (not shown) in the same RAN-based Notification Area (RNA). Therefore, the neighbor base station may be informed of the DL data transmission procedure for UE 101. In some embodiments, the neighbor base station may include an anchor base station. In detail, the anchor base station may be a designated serving base station to transmit/receive data to/from UE 101 at a given frame. In some embodiments, the neighbor base station may include the last serving base station of UE 101.

Figure 5A:
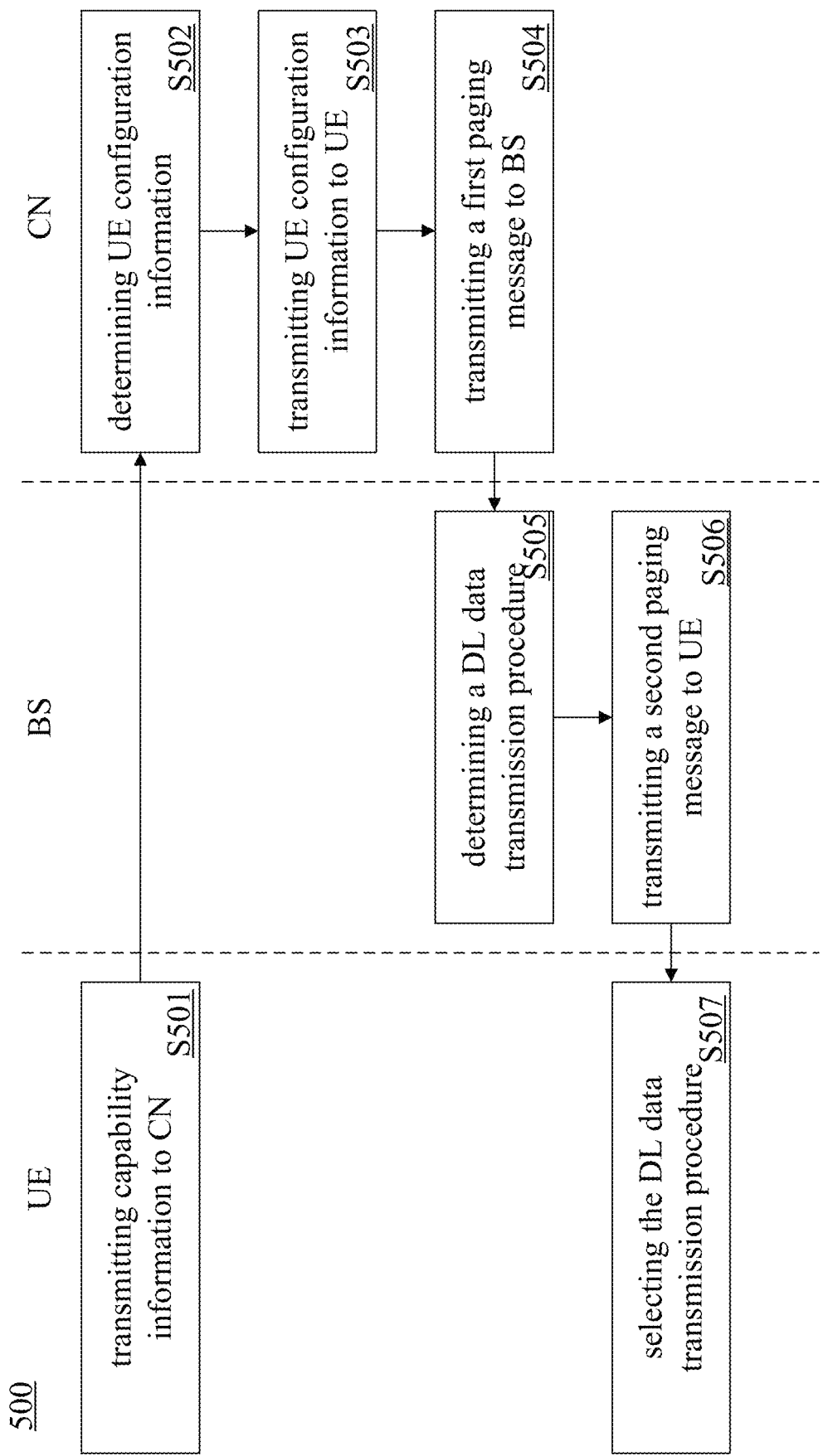
FIGS. 5A to 5D illustrate flow charts of a method for wireless communications according to an embodiment of the present disclosure.

FIGS. 5A to 5D illustrate flow charts of a method for wireless communications in accordance with some embodiments of the present application. Referring to FIG. 5A, method 500 is performed by a UE (e.g., UE 101), a BS (e.g., BS 102) and a CN (e.g., CN 103) in some embodiments of the present application.

Operation S501 is executed to transmit, by UE, capability information to CN for indicating to CN at least one DL data transmission procedure supported by UE. Operation S502 is executed to determine, by CN, UE configuration information for UE according to the capability information of UE. The UE configuration information may include a determined DL data transmission procedure for UE under an idle status or an inactive status. Operation S503 is executed to transmit, by CN, the UE configuration information to UE. Operation S501 to S503 may be executed during a NAS procedure.

When UE is under the idle status and CN needs to transmit DL data to UE, operation S504 is executed to transmit, by CN, a first paging message to BS which serves UE. The first paging message may include a UE identification of UE and the UE configuration information. Operation S505 is executed to determine, by BS, a DL data transmission procedure for UE 101 according to the UE configuration information. Operation S506 is executed to transmit, by BS, a second paging message to UE. The second paging message may include a procedure indication. After UE receives the second paging message, operation S507 is executed to select, by UE, the DL data transmission procedure according to the procedure indication.

In some embodiments, the procedure indication may indicate to UE to select the DL data transmission procedure from one of the following DL data transmission procedures: (1) Msg.2 based RA procedure; (2) Msg.4 based RA procedure; (3) 2-step RACH procedure; (4) regular RA procedure; (5) preconfigured uplink resource procedure; (6) 4-step RACH procedure and ( ) procedure where DL information is transmitted in paging message.

Furthermore, in some embodiments, there may be a default setting of a procedure set configured in UE and BS. The procedure set may be set including at least one of: (1) the Msg.2 based RA procedure; (2) the Msg.4 based RA procedure; (3) the 2-step RACH procedure; (4) the preconfigured uplink resource procedure; (5) the 4-step RACH procedure; (6) the regular RA procedure, and (7) procedure where DL information is transmitted in paging message. Furthermore, the procedure set may be:

- set A including the Msg.2 based RA procedure, the Msg.4 based RA procedure, the 2-step RACH procedure, the preconfigured uplink resource procedure and the regular RA procedure;
- set B including the Msg.4 based RA procedure, the 2-step RACH procedure, the preconfigured uplink resource procedure and the regular RA procedure;
- set C including the 2-step RACH procedure, a 4-step RACH procedure and the preconfigured uplink resource procedure;
- set D including the 2-step RACH procedure, the 4-step RACH procedure, the preconfigured uplink resource procedure and the regular RA procedure;
- set E including the 2-step RACH procedure and the preconfigured uplink resource procedure;
- set F including the 2-step RACH procedure, the preconfigured uplink resource procedure and the regular RA procedure;
- set G including the 4-step RACH procedure, the preconfigured uplink resource procedure and the regular RA procedure;
- set H including the 4-step RACH procedure and the preconfigured uplink resource procedure;
- set I including the 2-step RACH procedure and the 4-step RACH procedure; or
- set J including the 2-step RACH procedure, the 4-step RACH procedure, and the regular RA procedure.

In these embodiments, the procedure indication indicates to UE to select the DL data transmission procedure from one element of the procedure set.

Figure 5B:
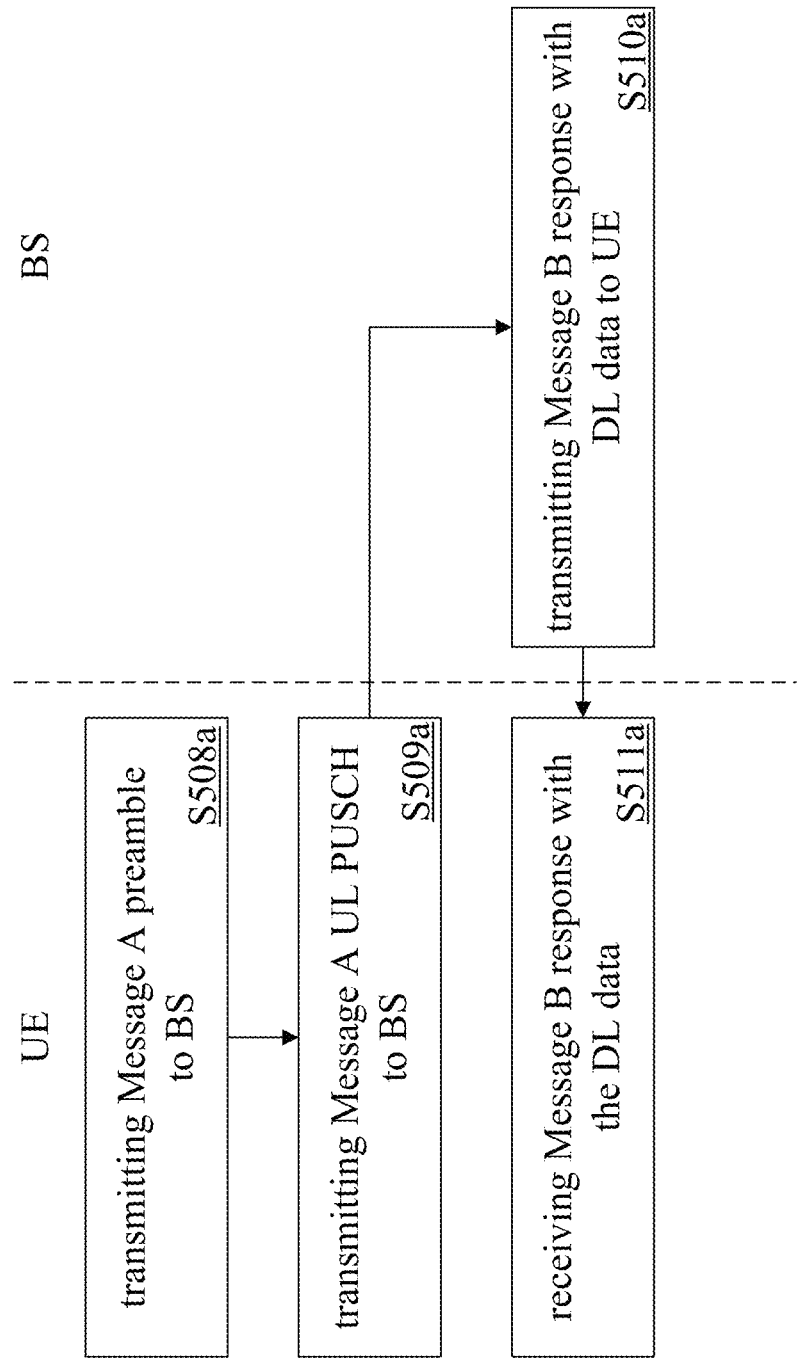

Referring to FIG. 5B, in some embodiments, 2-step RACH procedure may be applied as the DL data transmission procedure between UE and BS. In particular, the procedure indication from BS indicates to UE to select 2-step RACH procedure as the DL data transmission procedure.

Operation S508a is executed to transmit, by UE, Message A preamble (i.e., Message A preamble of 2-step RACH procedure) to BS. Operation S509a is executed to transmit, by UE, Message A UL PUSCH (i.e., Message A UL PUSCH of 2-step RACH procedure) to BS. Operation S510a is executed to transmit, by BS, Message B response (i.e., Message B response of 2-step RACH procedure) with DL data to UE. Operation S511a is executed to receive, by UE, the Message B response with the DL data from BS.

Figure 5C:
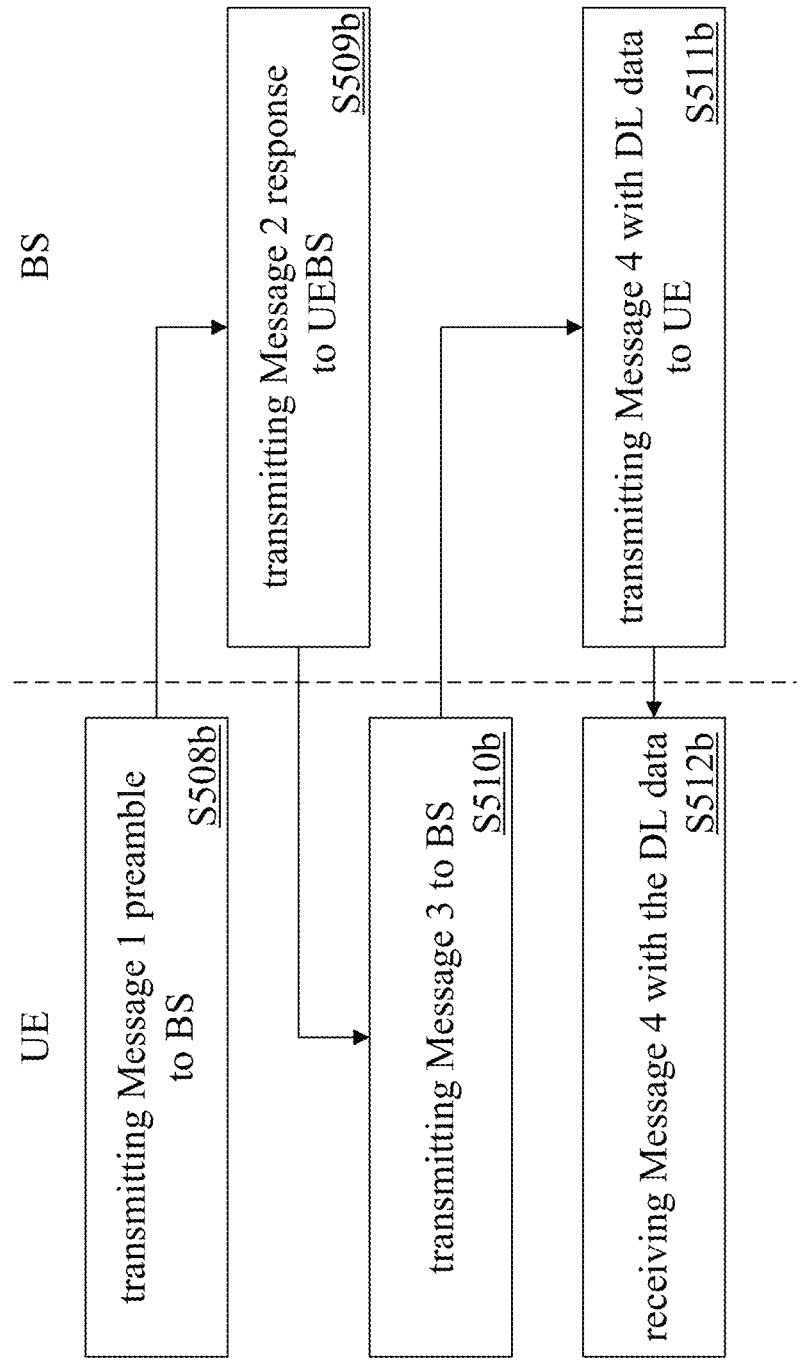

Referring to FIG. 5C, in some embodiments, Msg.4 based RA procedure may be applied as the DL data transmission procedure between UE and BS. In particular, the procedure indication from BS indicates to UE to select Msg.4 based RA RACH procedure as the DL data transmission procedure.

Operation S508b is executed to transmit, by UE, Message 1 preamble (i.e., Message 1 preamble of Msg.4 based RA procedure) to BS. Operation S509b is executed to transmit, by BS, Message 2 RA response (i.e., Message 2 RA response of Msg.4 based RA procedure) to UE. Operation S510b is executed to transmit, by UE, Message 3 (i.e., Message 3 of Msg.4 based RA procedure) to BS. Operation S511b is executed to transmit, by BS, Message 4 (i.e., Message 4 of Msg.4 based RA procedure) which includes DL data to UE. Operation S512b is executed to receive, by UE, Message 4 including the DL data from BS.

Figure 5D:
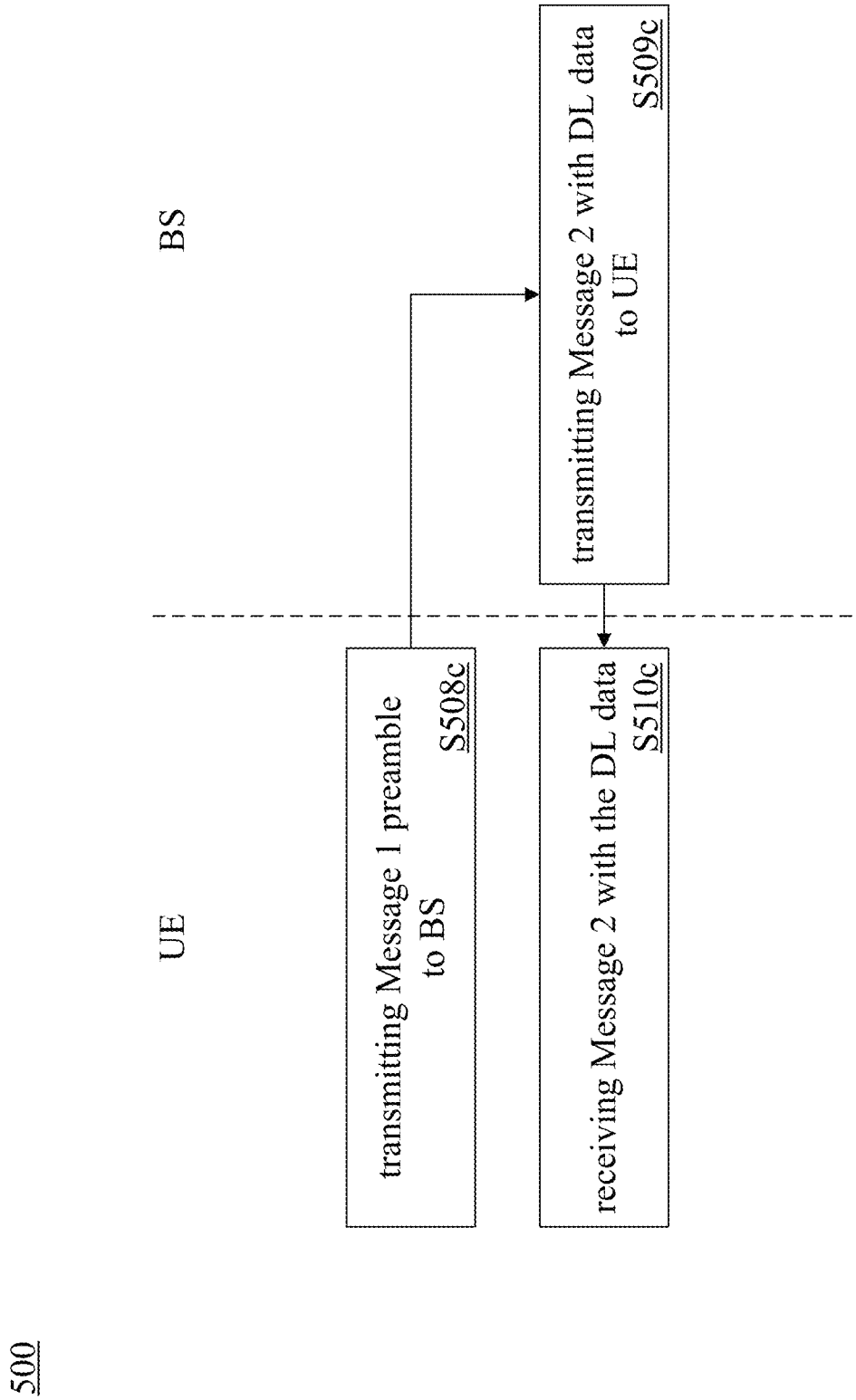

Referring to FIG. 5D, in some embodiments, Msg.2 based RA procedure may be applied as the DL data transmission procedure between UE and BS. In particular, the procedure indication from BS indicates to UE to select Msg.2 based RA RACH procedure as the DL data transmission procedure.

Operation S508c is executed to transmit, by UE, Message 1 preamble (i.e., Message 1 preamble of Msg.2 based RA procedure) to BS. Operation S509c is executed to transmit, by BS, Message 2 (i.e., Message 2 of Msg.2 based RA procedure) which includes DL data to UE. Operation S510c is executed to receive, by UE, Message 2 including the DL data from BS.

Figure 6A:
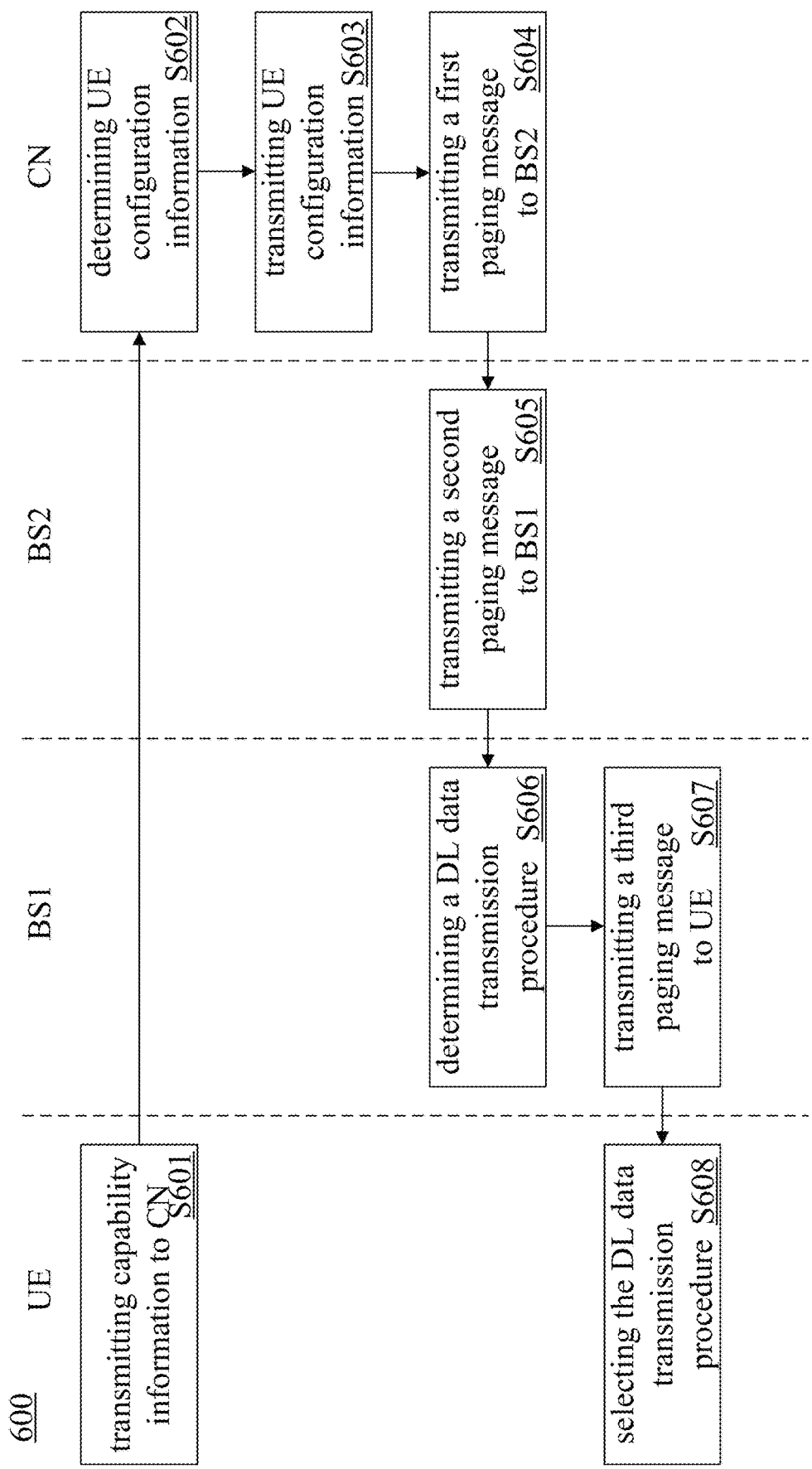
FIGS. 6A to 6D illustrate flow charts of a method for wireless communications according to an embodiment of the present disclosure.

FIGS. 6A to 6D illustrate flow charts of a method for wireless communications in accordance with some embodiments of the present application. Referring to FIG. 6A, method 600 is performed by a UE (e.g., UE 101), a BS1 (e.g., BS 102), a BS2 (e.g., BS 104) and a CN (e.g., CN 103) in some embodiments of the present application.

Operation S601 is executed to transmit, by UE, capability information to CN for indicating to CN at least one DL data transmission procedure supported by UE. Operation S602 is executed to determine, by CN, UE configuration information for UE according to the capability information of UE. The UE configuration information may include a determined DL data transmission procedure for UE under an idle status or an inactive status. Operation S603 is executed to transmit, by CN, the UE configuration information to UE. Operation S601 to S603 may be executed during a NAS procedure.

When UE is under the inactive status and CN needs to transmit DL data to UE, operation S604 is executed to transmit, by CN, a first paging message to BS2 which is the last serving base station of UE. The first paging message may include a UE identification of UE and the UE configuration information. Operation S605 is executed to transmit, by BS2, a second paging message to BS1. Operation S606 is executed to determine, by BS1, a DL data transmission procedure.

In some embodiments, the second paging message may include the UE identification and the UE configuration information of UE. In operation S606, BS1 may determine the DL data transmission procedure for UE according to the UE configuration information. In some embodiments, BS2 may determine the DL data transmission procedure for UE according to the UE configuration information and the second paging message include an indication which indicate to BS1 the DL data transmission procedure for UE. Accordingly, in operation S606, BS1 may determine the DL data transmission procedure for UE according to the indication of the second paging message.

Operation S607 is executed to transmit, by BS1, a third paging message to UE. The third paging message may include a procedure indication. After UE receives the third paging message, operation S608 is executed to select, by UE, the DL data transmission procedure according to the procedure indication.

Figure 6B:
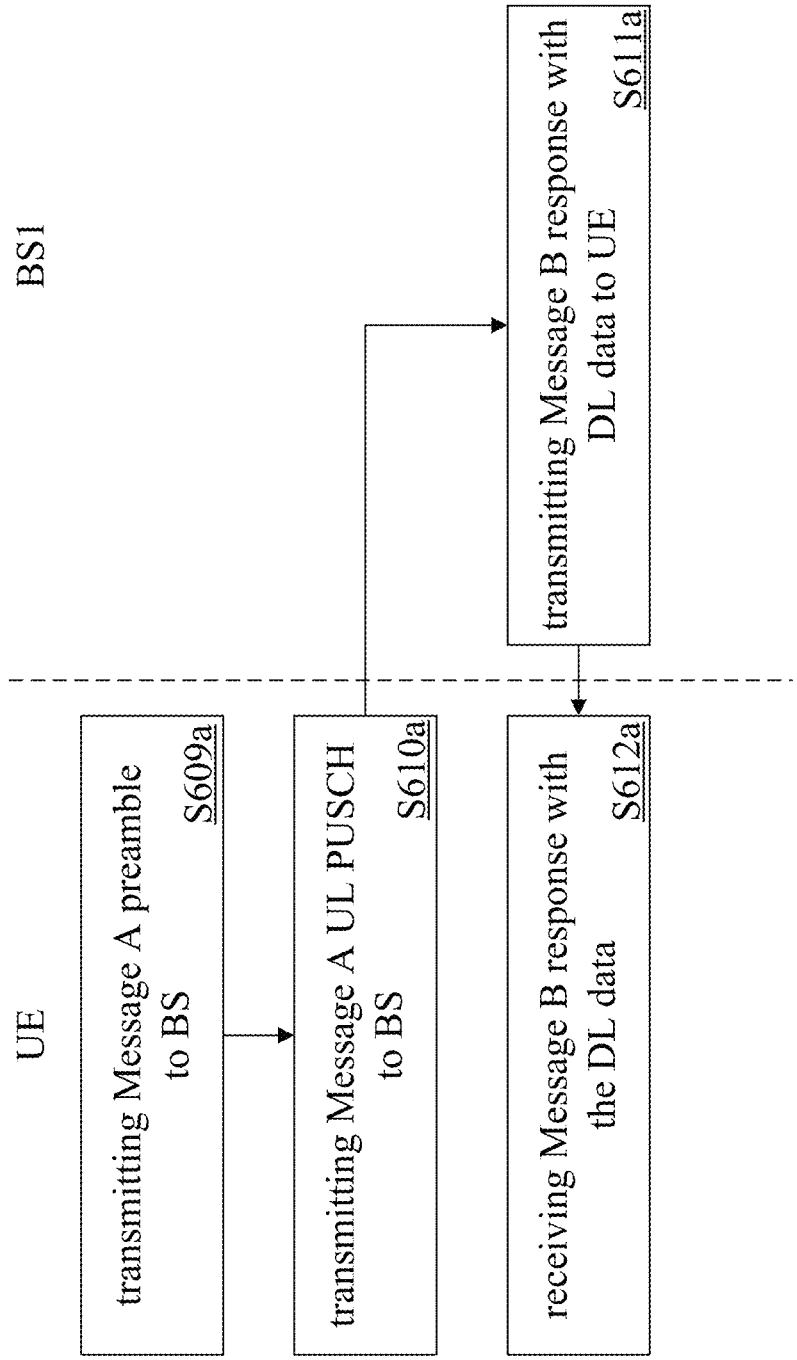

Referring to FIG. 6B, in some embodiments, 2-step RACH procedure may be applied as the DL data transmission procedure between UE and BS1. In particular, the procedure indication from BS1 indicates to UE to select 2-step RACH procedure as the DL data transmission procedure.

Operation S609a is executed to transmit, by UE, Message A preamble (i.e., Message A preamble of 2-step RACH procedure) to BS1. Operation S610a is executed to transmit Message A UL PUSCH (i.e., Message A UL PUSCH of 2-step RACH procedure) to BS1. Operation S611a is executed to transmit, by BS1, Message B response (i.e., Message B response of 2-step RACH procedure) with DL data to UE. Operation S612a is executed to receive, by UE, the Message B response with the DL data from BS1.

Figure 6C:
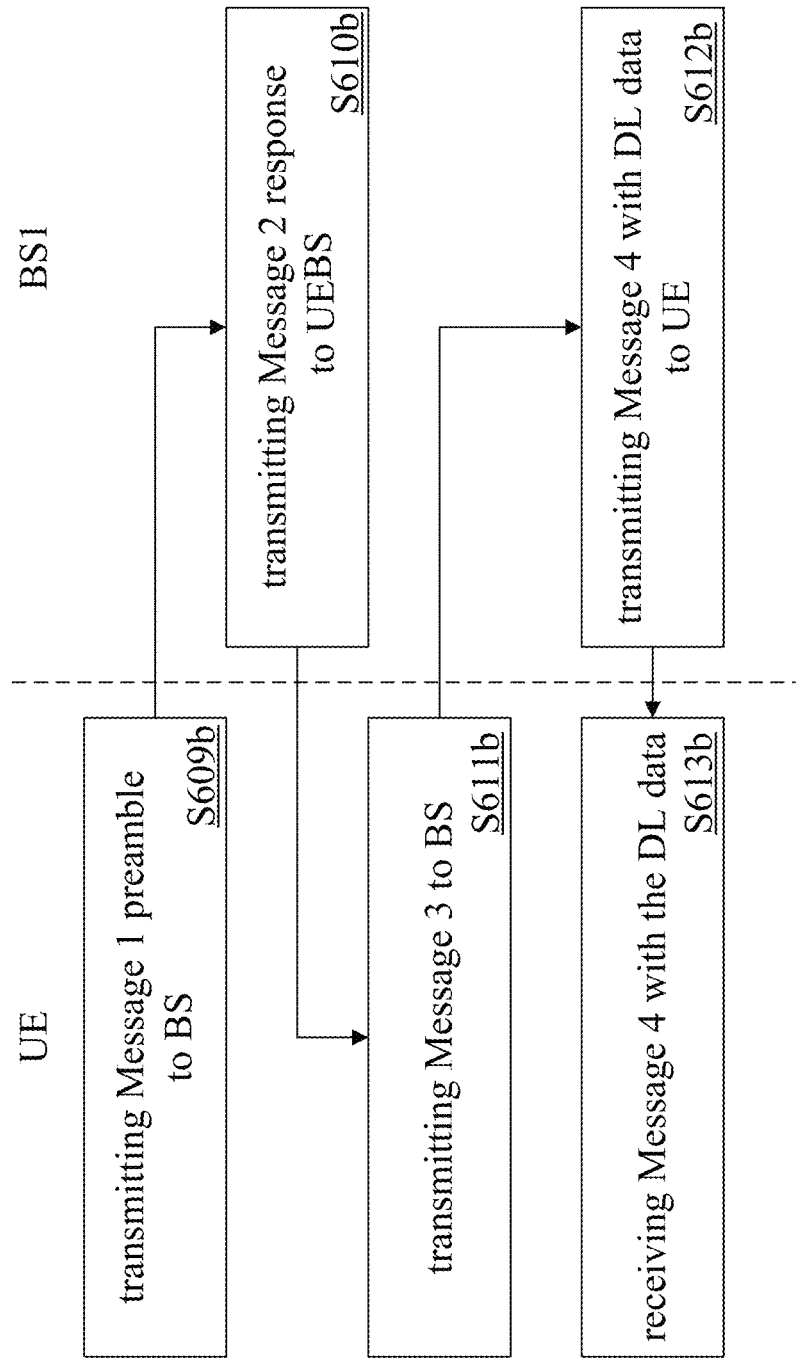

Referring to FIG. 6C, in some embodiments, Msg.4 based RA procedure may be applied as the DL data transmission procedure between UE and BS1. In particular, the procedure indication from BS1 indicates to UE to select Msg.4 based RA RACH procedure as the DL data transmission procedure.

Operation S609b is executed to transmit, by UE, Message 1 preamble (i.e., Message 1 preamble of Msg.4 based RA procedure) to BS1. Operation S610b is executed to transmit, by BS1, Message 2 RA response (i.e., Message 2 RA response of Msg.4 based RA procedure) to UE. Operation S611b is executed to transmit, by UE, Message 3 (i.e., Message 3 of Msg.4 based RA procedure) to BS1. Operation S612b is executed to transmit, by BS1, Message 4 (i.e., Message 4 of Msg.4 based RA procedure) which includes DL data to UE. Operation S613b is executed to receive, by UE, Message 4 including the DL data from BS1.

Figure 6D:
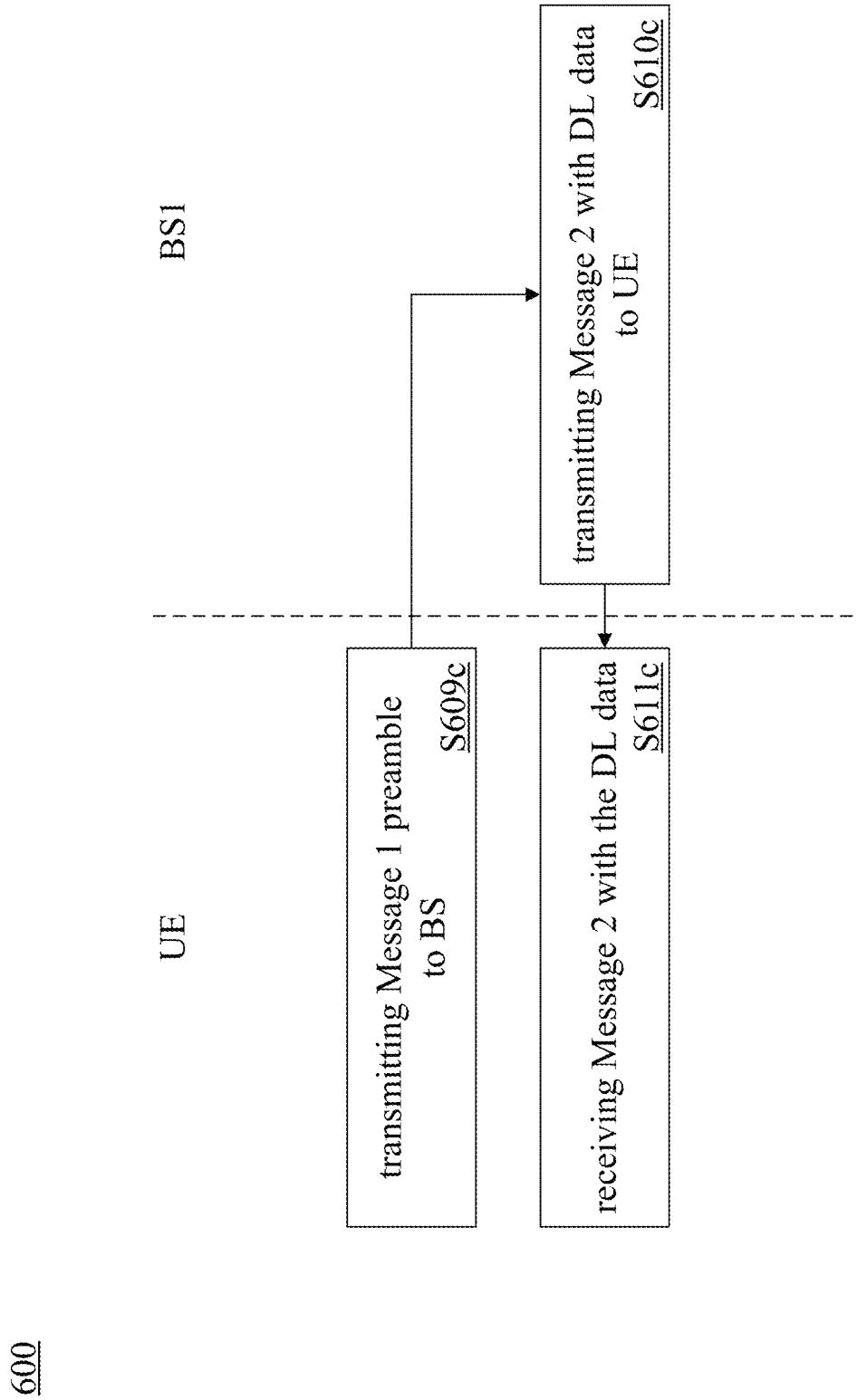

Referring to FIG. 6D, in some embodiments, Msg.2 based RA procedure may be applied as the DL data transmission procedure between UE and BS1. In particular, the procedure indication from BS1 indicates to UE to select Msg.2 based RA RACH procedure as the DL data transmission procedure.

Operation S609c is executed to transmit, by UE, Message 1 preamble (i.e., Message 1 preamble of Msg.2 based RA procedure) to BS1. Operation S610c is executed to transmit, by BS1, Message 2 (i.e., Message 2 of Msg.2 based RA procedure) which includes DL data to UE. Operation S611c is executed to receive, by UE, Message 2 including the DL data from BS1.

In some embodiments, the procedure indication of the method 500 or 600 may indicate step information the DL data should be transmitted. In particular, the procedure indication may indicate to UE to receive DL data in: (1) step of Message B corresponding to 2-step RACH procedure; (2) step of Message 2 after preamble corresponding to Msg.2 based RA procedure; (3) step of Message 2 after preconfigured uplink resource; (4) step of Message 4 after Message 3 corresponding to Msg.4 based RA procedure; or (5) step after entering connected mode in network by RA procedure.

In some embodiments, the procedure indication of the method 500 or 600 may indicate step information the UL data should be required. In particular, the procedure indication may indicate to UE to transmit UL data in: (1) step of Message A corresponding to 2-step RACH procedure; (2) step of Message 3 after Message 2 corresponding to Msg.2 based RA procedure; (3) step of applying preconfigured uplink resource; (4) step of Message 3 before Message 4 corresponding to Msg.4 based RA procedure; (5) step before download data initially transmitted from BS 102; (6) step after download data initially transmitted from BS 102; or (7) step after entering connected mode in network by RA procedure.

In some embodiments, CN of the method 600 may include an AMF entity and may transmit data size information and or service type information of UE to BS2. After receiving the data size information and or the service type information of UE, BS2 may transmit the data size information and or the service type information of UE to BS1.

In some embodiments, the DL data transmission procedure of the method 500 or 600 may be initialed as the selected DL data transmission procedure between UE and BS/BS1 when BS/BS1 supports the selected DL data transmission procedure. In some embodiments, the DL data transmission procedure of the method 500 or 600 may be initiated as a regular RA procedure between UE and BS/BS1 when BS/BS1 does not support the selected DL data transmission procedure.

In some embodiments, BS/BS1 of the method 500 or 600 may broadcast a SIB to UE and the SIB may include a supporting DL data transmission procedure of BS/BS1. Subsequently, UE may receive the SIB from BS/BS1 and be indicated the supporting DL data transmission procedure of BS/BS1.

In some embodiments, BS/BS1 of the method 500 or 600 may transmit information of the DL data transmission procedure to a neighbor base station in the same RNA. Therefore, the neighbor base station may be informed of the DL data transmission procedure for UE.

Figure 7:
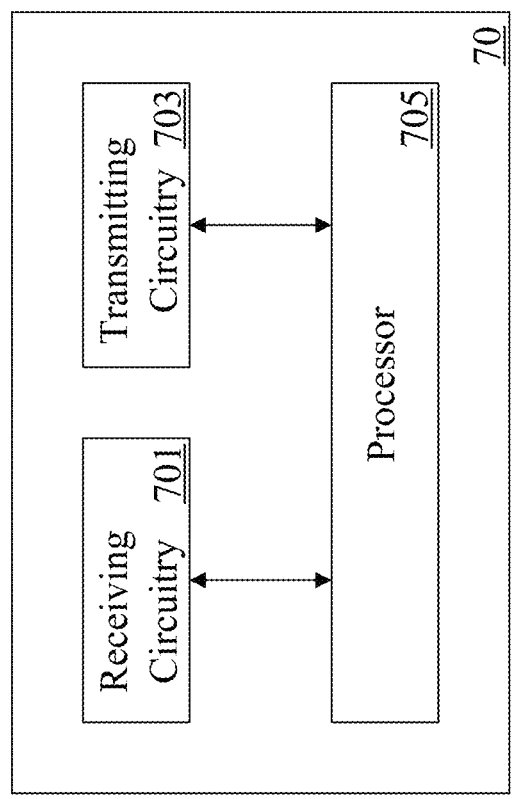
FIG. 7 illustrates an example block diagram of an apparatus according to an embodiment of the present disclosure.

FIG. 7 illustrates an example block diagram of an apparatus 70 according to an embodiment of the present disclosure.

As shown in FIG. 7, the apparatus 70 may include at least one non-transitory computer-readable medium (not illustrated in FIG. 7), a receiving circuitry 701, a transmitting circuitry 703, and a processor 705 coupled to the non-transitory computer-readable medium (not illustrated in FIG. 7), the receiving circuitry 701 and the transmitting circuitry 703. The apparatus 70 may be a user equipment, a base station or an AMF entity of core network.

Although in this figure, elements such as processor 705, transmitting circuitry 703, and receiving circuitry 701 are described in the singular, the plural is contemplated unless limitation to the singular is explicitly stated. In some embodiments of the present disclosure, the receiving circuitry 701 and the transmitting circuitry 703 are combined into a single device, such as a transceiver. In certain embodiments of the present disclosure, the apparatus 70 may further include an input device, a memory, and/or other components.

In some embodiments of the present disclosure, the user equipment information may include UE identity information. For example, the UE identity information may be UE 5G-S-TMSI, the value of 5G-S-TMSI mode 1024, or a default value.

In some embodiments of the present disclosure, the non-transitory computer-readable medium may have stored thereon computer-executable instructions to cause a processor to implement the method with respect to the base station as described above. For example, the computer-executable instructions, when executed, cause the processor 705 interacting with receiving circuitry 701 and transmitting circuitry 703, so as to perform the operations with respect to BS depicted in FIGS. 1 and 3.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 70 interacting with receiving circuitry 701 and transmitting circuitry 703, so as to perform the operations with respect to UE depicted in FIGS. 1 and 3.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 70 interacting with receiving circuitry 701 and transmitting circuitry 703, so as to perform the operations with respect to CN (e.g., AMF entity of CN) depicted in FIGS. 1 and 3.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

We claim:

1. A method performed by a user equipment (UE), comprising:
transmitting capability information that indicates one or more downlink data transmission procedures supported by the UE and a preferred downlink data transmission procedure of the one or more downlink data transmission procedures;
receiving a paging message comprising configuration information that indicates at least one downlink data transmission procedure of the one or more downlink data transmission procedures; and
receiving, based at least in part on the at least one downlink data transmission procedure, a downlink data transmission.

2. The method of claim 1, wherein the preferred downlink data transmission procedure of the one or more downlink data transmission procedures is based at least in part on the UE being in an idle state or an inactive state.

3. The method of claim 1, wherein the capability information comprises a priority of the at least one downlink data transmission procedure for the UE in an idle state or an inactive state.

4. The method of claim 1, wherein the paging message comprises available resources associated with an idle state or an inactive state of the UE.

5. The method of claim 1, wherein the paging message comprises a procedure indication, and wherein the method further comprises selecting the at least one downlink data transmission procedure according to the procedure indication.

6. The method of claim 5, wherein the procedure indication indicates to the UE that the UE selects the at least one downlink data transmission procedure from one of: a Message 2 based mobile terminated (MT) random access (RA) procedure, a Message 4 based MT RA procedure, a two-step random access channel (RACH) procedure, a preconfigured uplink resource procedure, or a regular RA procedure.

7. The method of claim 1, wherein the capability information indicates a ranking of the one or more downlink data transmission procedures based at least in part on respective priorities of the one or more downlink data transmission procedures.

8. A user equipment (UE) for wireless communication, comprising:
at least one memory; and
at least one processor coupled with the at least one memory and configured to cause the UE to:
transmit capability information that indicates one or more downlink data transmission procedures supported by the UE and a preferred downlink data transmission procedure of the one or more downlink data transmission procedures;
receive a paging message comprising configuration information that indicates at least one downlink data transmission procedure of the one or more downlink data transmission procedures; and
receive, based at least in part on the at least one downlink data transmission procedure, a downlink data transmission.

9. The UE of claim 8, wherein the preferred downlink data transmission procedure of the one or more downlink data transmission procedures is based at least in part on the UE being in an idle state or an inactive state.

10. The UE of claim 8, wherein the capability information comprises a priority of the at least one downlink data transmission procedure for the UE in an idle state or an inactive state.

11. The UE of claim 8, wherein the paging message comprises available resources associated with an idle state or an inactive state of the UE.

12. The UE of claim 8, wherein the paging message comprises a procedure indication, and wherein the at least one processor is further configured to cause the UE to select the at least one downlink data transmission procedure according to the procedure indication.

13. The UE of claim 12, wherein the procedure indication indicates to the UE that the UE selects the at least one downlink data transmission procedure from one of: a Message 2 based mobile terminated (MT) random access (RA) procedure, a Message 4 based MT RA procedure, a two-step random access channel (RACH) procedure, a preconfigured uplink resource procedure, or a regular RA procedure.

14. The UE of claim 8, wherein the capability information indicates a ranking of the one or more downlink data transmission procedures based at least in part on respective priorities of the one or more downlink data transmission procedures.

15. A network equipment (NE) for wireless communication, comprising:
- at least one memory; and
- at least one processor coupled with the at least one memory and configured to cause the NE to:
  - receive capability information that indicates one or more downlink data transmission procedures supported by a user equipment (UE) and a preferred downlink data transmission procedure of the one or more downlink data transmission procedures;
  - transmit a paging message comprising configuration information that indicates at least one downlink data transmission procedure of the one or more downlink data transmission procedures; and
  - transmit, based at least in part on the at least one downlink data transmission procedure, a downlink data transmission.

16. The NE of claim 15, wherein to receive the capability information, the at least one processor is configured to cause the NE to:
- receive, prior to the paging message, an additional paging message from at least one of a core network or a base station, wherein the additional paging message comprises an indication of the at least one downlink data transmission procedure; and
- determine the at least one downlink data transmission procedure according to the indication.

17. The NE of claim 15, wherein the at least one processor is further configured to cause the NE to determine the at least one downlink data transmission procedure according to the capability information.

18. The NE of claim 15, wherein the capability information comprises a priority associated with the one or more downlink data transmission procedures.

19. The NE of claim 15, wherein the at least one processor is further configured to cause the NE to transmit an additional paging message to the UE, wherein the additional paging message comprises a procedure indication associated with the at least one downlink data transmission procedure based at least in part on an idle state of the UE or an inactive state of the UE.

20. A processor for wireless communication, comprising:
- at least one controller coupled with at least one memory and configured to cause the processor to:
  - transmit capability information that indicates one or more downlink data transmission procedures supported by the processor and a preferred downlink data transmission procedure of the one or more downlink data transmission procedures;
  - receive a paging message comprising configuration information that indicates at least one downlink data transmission procedure of the one or more downlink data transmission procedures; and
  - receive, based at least in part on the at least one downlink data transmission procedure, a downlink data transmission.

\* \* \* \* \*